(12) United States Patent
Malik

(10) Patent No.: US 8,565,531 B2
(45) Date of Patent: Oct. 22, 2013

(54) EDGE DETECTION FOR MIXED RASTER CONTENT (MRC) IMAGES FOR IMPROVED COMPRESSION AND IMAGE QUALITY

(75) Inventor: Amal Z. Malik, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 953 days.

(21) Appl. No.: 12/576,754

(22) Filed: Oct. 9, 2009

(65) Prior Publication Data

US 2011/0085735 A1 Apr. 14, 2011

(51) Int. Cl.
*G06K 9/48* (2006.01)
*G06K 9/36* (2006.01)
*G06K 9/34* (2006.01)
*G06K 9/54* (2006.01)
*H04N 1/40* (2006.01)

(52) U.S. Cl.
USPC ........... 382/199; 382/232; 382/164; 382/173; 382/302; 358/462

(58) Field of Classification Search
USPC ........... 382/199, 232, 164, 173, 302; 358/462
See application file for complete search history.

(56) References Cited

U.S. PATENT DOCUMENTS

| | | | | |
|---|---|---|---|---|
| 5,293,252 | A * | 3/1994 | Kim et al. | 382/250 |
| 6,614,928 | B1 * | 9/2003 | Chung et al. | 382/154 |
| 7,236,641 | B2 | 6/2007 | Curry et al. | |
| 7,242,802 | B2 | 7/2007 | Curry et al. | |
| 7,324,120 | B2 | 1/2008 | Curry et al. | |
| 7,343,046 | B2 | 3/2008 | Curry et al. | |
| 7,375,856 | B2 | 5/2008 | Curry et al. | |
| 7,376,272 | B2 | 5/2008 | Fan et al. | |
| 7,403,661 | B2 | 7/2008 | Curry et al. | |
| 2007/0253620 | A1 | 11/2007 | Nagarajan et al. | |
| 2008/0292130 | A1 | 11/2008 | Nafarieh et al. | |

OTHER PUBLICATIONS

Gonzalez, et al., Digital Image Processing, reprinted in 1993, pp. 518-564, Addison-Wesley Publishing.
Amal Malik U.S. Appl. No. 12/329,078, filed Dec. 5, 2008.
Amal Malik U.S. Appl. No. 12/328,973, filed Dec. 5, 2008.

* cited by examiner

*Primary Examiner* — Kathleen Y Dulaney
(74) *Attorney, Agent, or Firm* — Pillsbury Winthrop Shaw Pittman, LLP

(57) ABSTRACT

A method for detecting edge pixels in an image plane based on intensity and neutrality of a current pixel is provided. The method includes detecting the edge pixels in the image plane based on predetermined criteria. The predetermined criteria determining whether: (a) a difference between the maximum value and the minimum value of the specified characteristic is greater than or equal to a predetermined threshold; and (b) (i) a difference between a current value and the minimum value of the specified characteristic, or (ii) a difference between a current value and the maximum value of the specified characteristic is greater than or equal to a predetermined threshold. The predetermined thresholds are determined based on intensity and neutrality of the current pixel.

27 Claims, 14 Drawing Sheets

NOTE: QUALITY OF FIGURE
IS LOW (ACTUAL IMAGE)

NOTE: QUALITY OF FIGURE IS LOW (ACTUAL IMAGE)

NOTE: QUALITY OF FIGURE
IS LOW (ACTUAL IMAGE)

EDGE DETECTION FOR MIXED RASTER CONTENT (MRC) IMAGES FOR IMPROVED COMPRESSION AND IMAGE QUALITY

BACKGROUND

1. Field

The present disclosure relates generally to a method and a system for detecting edge pixels in an image plane, when separating an image signal into a set of image planes.

2. Description of Related Art

Scanning and exporting color images to a network has started to become one of the standard features offered by digital multifunction devices. File size of a color image is an important factor while exporting color images. In addition to offering different resolutions, different compression schemes are being offered to reduce the file size of the color image that needs to be exported. One of the popular compression/file formats that are currently being offered is Mixed or Multiple Raster Content (MRC) representation. The MRC representation provides a way to achieve high image quality with small file size.

The MRC representation of documents is versatile. It provides the ability to represent color images and either color or monochrome text. The MRC representation enables the use of multiple "planes" for the purpose of representing the content of documents. The MRC representation is becoming increasingly important in the marketplace. It has been already established as the main color-fax standard. It is also offered as a selection in the Scan-to-Export feature, for example, in digital multifunction devices.

In a MRC representation, an image is represented by more than one image plane. The main advantage of the MRC representation of documents is to provide an efficient way to store, transmit, and manipulate large digital color documents. The method exploits the properties of the human vision system, where the ability to distinguish small color variations is greatly reduced in the presence of high-contrast edges. The edge information is normally separated from the smoothly varying color information, and encoded (possibly at higher resolution than 1 bit per pixel) in one of the planes, called the Selector plane. The selector plane may have only one bit per pixel that controls the selection from either foreground or background. Following a careful separation, the various planes could be independently compressed using standard compression schemes (such as JPEG and G4) with good compression and high quality at the same time.

In digital image processing, an edge within an image is referred to a sharp change in local intensity or lightness. In other words, edges are features within an image that possess strong intensity contrast. Edges occur between distinct objects in a scene, or within textures and structure within an object. For instance, typographic characters on a white page background produce distinct edges. Edge pixels in a digital image are those pixels that occur at and about an edge in the image.

FIGS. 16 and 17 show a digital image (e.g., a bar chart) and an edge profile that is created from the digital image, respectively. As shown in FIG. 17, the black areas in the edge profile represent the edges within the digital image. The edge pixels are the pixels that occur at and about the edges (e.g., black areas in the edge profile as shown in FIG. 19) in the image.

In a three-layer segmentor, which is used for MRC representation, a minimum value and a maximum value for each pixel are calculated using a min/max module. The min/max module in the three-layer segmentor calculates the minimum value and the maximum value for each pixel based on a neighborhood window (e.g., an 8×8 neighborhood window) around that pixel (i.e., current pixel of interest). The min/max module in the three-layer segmentor may use a sliding window technique to determine the minimum value and the maximum value for each pixel. These minimum and maximum values are sometimes very different from the value of the current pixel of interest which may cause false detection of edges thus resulting in poor image quality and bigger file sizes.

The three-layer segmentor detects the edge pixels by comparing the minimum value or the maximum value of the pixels within the neighborhood window around the current pixel. The three-layer segmentor compares the current pixel value to determine the sign of the edges and then places the edges either in the background layer or the foreground layer which are further cleaned up in the later modules of the three-layer segmentor.

Also, the three-layer segmentor is configured to detect strong and weak edges in an image and to place dark valued edges in the foreground layer. The current three-layer segmentor sometimes detects false edges and hence creates large file sizes, for example, in photographic images. The current three-layer segmentor may also cause broken text in the low contrast text areas.

The present disclosure proposes a method that is configured to reduce false edge detection in all MRC models (i.e., currently existing models and any upcoming models). The method not only improves the text quality in the low contrast areas, but also improves the file sizes, for example, in photographic images. The method and the system for detecting edge pixels in an image plane described in the present disclosure can be extended to any MRC model, including, but not limited to a N layer MRC model, a 3+1 layer MRC model, a 3+N layer MRC model, or any other MRC models.

SUMMARY

According to one aspect of the present disclosure, a method for detecting edge pixels in an image plane based on intensity and neutrality of a current pixel, when separating an image signal into a set of image planes, is provided. The method includes: searching, via a min-max module, for a minimum value and a maximum value of a specified characteristic within at least one predefined neighborhood pixel window centered on a current pixel in the image signal; and detecting, via a dynamic threshold module, the edge pixels in the image plane based on predetermined criteria. The predefined neighborhood pixel window includes the edge pixels. The predetermined criteria for detecting the edge pixels includes determining whether: (a) a difference between the maximum value and the minimum value of the specified characteristic is greater than or equal to a predetermined threshold, wherein the predetermined threshold is determined based on intensity and neutrality of the current pixel; and (b) (i) a difference between a current value and the minimum value of the specified characteristic, or (ii) a difference between a current value and the maximum value of the specified characteristic is greater than or equal to a predetermined threshold, the predetermined threshold is determined based on intensity and neutrality of the current pixel.

According to another aspect of the present disclosure, a system for detecting edge pixels in an image plane based on intensity and neutrality of a current pixel, when separating an image signal into a set of image planes, is provided. The system includes a min-max module and a dynamic threshold module. The min-max module is configured to search for a minimum value and a maximum value of a specified characteristic within at least one predefined neighborhood pixel window centered on a current pixel in the image signal. The predefined neighborhood pixel window comprises the edge pixels. The dynamic threshold module is configured to detect the edge pixels in the image plane based on predetermined criteria. The predetermined criteria for detecting the edge pixels includes determining whether: (a) a difference between the maximum value and the minimum value of the specified characteristic is greater than or equal to a predetermined threshold, wherein the predetermined threshold is determined based on intensity and neutrality of the current pixel; and (b) (i) a difference between a current value and the minimum value of the specified characteristic, or (ii) a difference between a current value and the maximum value of the specified characteristic is greater than or equal to a predetermined threshold, wherein the predetermined threshold is determined based on intensity and neutrality of the current pixel.

According to yet another aspect of the present disclosure, a method for detecting edge pixels in an image plane based on intensity and neutrality of a current pixel, when separating an image signal into a set of image planes, is provided. The method includes: dividing the image plane into one or more regions based on the intensity and the neutrality of the current pixel; searching for a minimum value and a maximum value of a specified characteristic within at least one predefined neighborhood pixel window centered on the current pixel in the one or more regions of the image plane; and detecting, via a dynamic threshold module, the edge pixels in the one or more regions in the image plane based on predetermined criteria, wherein the predetermined criteria for detecting the edge pixels in the one or more regions in the image plane comprises determining whether: (a) a difference between the maximum value and the minimum value of the specified characteristic is greater than or equal to a predetermined threshold and (b) (i) a difference between a current value and the minimum value of the specified characteristic, or (ii) a difference between a current value and the maximum value of the specified characteristic is greater than or equal to a predetermined threshold. The intensity of the current pixel is dependent on a luminance value of a luminance channel of the current pixel, and the neutrality of the current pixel is dependent on a chrominance value of a first chrominance channel of the current pixel, and a chrominance value of a second chrominance channel of the current pixel. The predefined neighborhood pixel window comprises the edge pixels. The predetermined thresholds are based on the intensity and the neutrality of the current pixel in the image signal.

Other objects, features, and advantages of one or more embodiments of the present disclosure will seem apparent from the following detailed description, and accompanying drawings, and the appended claims.

BRIEF DESCRIPTION OF THE DRAWINGS

Various embodiments will now be disclosed, by way of example only, with reference to the accompanying schematic drawings in which corresponding reference symbols indicate corresponding parts, in which.

DETAILED DESCRIPTION

The present disclosure provides a method and a system that are configured to improve the edge detection in a three-layer MRC generation. Specifically, the method proposes using different threshold values that are based on the intensity of the current pixel of interest and the neutrality of the current pixel of interest. The threshold value is used to compare the difference between the maximum value and the minimum value of a specified characteristic in determining the existence of an edge. For example, smaller threshold values are used for pixels that are close to a neutral value, and are either dark or bright. The method also proposes the comparison between the current pixel value and the minimum value of the specified characteristic or between the current pixel value and the maximum value of the specified characteristic as an additional edge finding condition. The comparison between the current pixel value and the minimum value of the specified characteristic or between the current pixel value and the maximum value of the specified characteristic is configured to avoid detection of false edges. The method not only improves text quality in low contrast areas but also reduces file size (i.e., by reducing false edge detection) in pictorial regions.

The image signal represents a digitally scanned document. The image planes are suitable for a Mixed Raster Content (MRC) representation of the digitally scanned document. In one embodiment, the MRC representation includes three layers or planes: Foreground FG, Background BG, and Mask. In such embodiment, both the Foreground FG and Background BG are multi-level and the Mask is bi-level.

Figure 1:
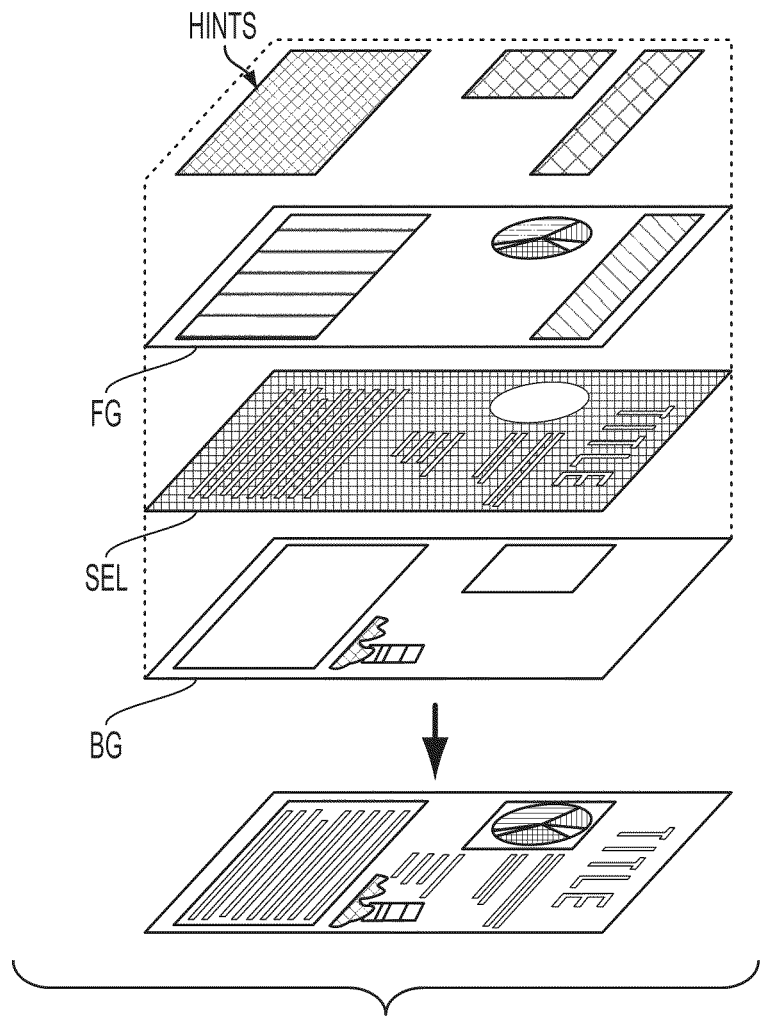
FIG. 1 illustrates an exemplary three layer MRC structure for documents.

FIG. 1 shows another MRC representation. The representation comprises up to four independent planes: Foreground FG, Background BG, Selector SEL, and Rendering Hints HINTS. In the most general case, there could be multiple Foreground and Selector pairs at higher levels. However, in most applications, the representation is limited to three or four planes. The Background plane is typically used for storing continuous-tone (i.e., contone) information, such as pictures and/or smoothly varying background colors. The Selector plane normally holds the image of text (binary) as well as other edge information (e.g., line art drawings). The Foreground plane usually holds the color of the corresponding text and/or line art. However, the MRC representation only specifies the planes and their associated compression methods. It does not otherwise restrict nor enforce the content of each of the planes. The content of each of the planes may be defined appropriately by an implementation of the MRC representation.

The MRC structure also allows for a fourth plane, the Rendering Hints plane, which is used for communicating additional information about the content of the document. For example, the Rendering Hints plane may carry the ICC (International Color Consortium) color hints that identify the best color matching strategy for the various objects on the page.

Computers and other electronic equipment typically depict color in 3-D coordinates such as RGB. Many image printing systems, on the other hand, print in either three-dimensional colorant space, cyan, magenta, yellow (CMY) or four-dimensional colorant space, cyan, magenta, yellow, and black (CMYK) which can be derived from the input values, e.g., RGB. Frequently, a device independent color space is used as an intermediate representation of the image. A common choice for such a device independent space is a luminance-chrominance space, denoted generically as $LC_1C_2$. The L component represents luminance or lightness, and $C_1$ and $C_2$ are the two chrominance coordinates representing red-green and yellow-blue variations, respectively. An example of a luminance-chrominance representation is L*a*b*, or YCbCr, etc. Translations are then derived from input RGB to $LC_1C_2$, and from $LC_1C_2$ to image printing system colorant space. In other words, if the image is in an RGB space, it is typically first converted to such a luminance-chrominance representation for simplicity of edge calculation. The particular luminance-chrominance representation used is not limiting, and any representation may be used.

A page description language (PDL) is a method of describing printed pages in a printer independent format. A PDL establishes as interface between a print driver or client and a print server or printer. No one standard PDL presently exists, and as a result a number of industry a standards have emerged. Currently existing PDL standards include PostScript® ("PS"), Hewlett Packard Printer Control Language ("HP-PCL") and Interpress Page Description Language. With any PDL or image format, there will inevitably be a step of translation of the PDL or image format data into a form usable by an output device, such as a printer. Printing hardware requires an input stream of binary data. Thus, the instructions within the image format, such as to "print a white line," will eventually have to be translated into the actual binary code. This code can then be applied to the modulation of a laser source in a raster output scanner, or applied sequentially to individual ejectors in an ink-jet printer.

The Foreground and Background planes are defined to be two full-color space, such as L*a*b* or YCbCr. The Selector plane is defined as a binary (1-bit deep) plane. One exemplary MRC representation specifies that the Foreground and Background are to be JPEG compressed, and that the Selector plane is to be ITU-G4 compressed (standard Group 4 facsimile compression). The Rendering Hints plane is considered to be optional, but if one is used, a compression scheme similar to the Lempel-Zev-Welch scheme may be used for its compression. In general, the Foreground, Background, Selector and Rendering Hints planes can all be at different resolutions, and they are not required to maintain the original source input resolution.

The method for assembling back a "segmented" MRC image from its components (i.e., planes) is by "pouring" the Foreground colors through the Selector plane "mask" on top of the Background plane, thus overwriting the previous content of the Background plane at these locations. In other words, the assembly is achieved by multiplexing between the Foreground and Background information on a pixel-by-pixel basis, based on the binary control signal of the Selector plane. For example, if the Selector value is 1, the content of Foreground is used; otherwise (i.e., for Selector value=0) the content of Background is used. The multiplexing operation is repeated on a pixel-by-pixel basis until all of the output pixels have been defined.

The main advantage of the MRC representation of documents is to provide an efficient way to store, transmit, and manipulate large digital color documents. The method exploits the properties of the human vision system, where the ability to distinguish small color variations is greatly reduced in the presence of high-contrast edges. The edge information is normally separated from the smoothly varying color information, and encoded (possibly at higher resolution than 1 Selector sample per source pixel) in the Selector plane. Following a careful separation, the various planes could be independently compressed using standard compression schemes (such as JPEG and G4) with good compression and high quality at the same time.

The Segment Module takes in a full color input image to be segmented and produces three separate outputs for the three MRC planes: the Foreground FGD, Background BGD, and Selector Sel planes, as well as several additional signals. The segment module is described in detail in U.S. Pat. No. 7,242,802, herein incorporated by reference in its entirety.

Figure 2:
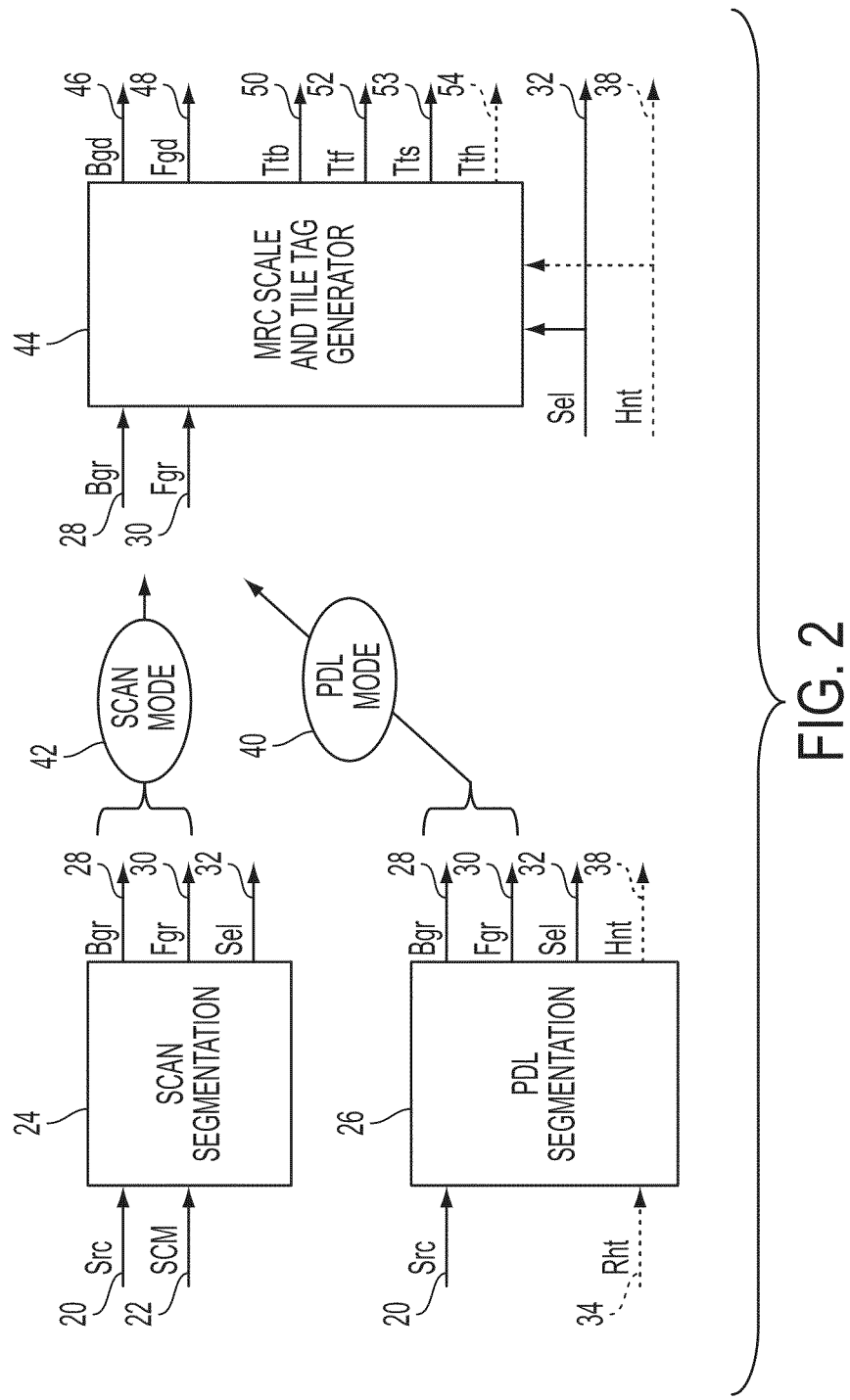
FIG. 2 is a block diagram of the Segment Module.

A block diagram of the Segment Module is shown in FIG. 2. The Segment Module is composed of two stages: a Segmentation stage 24, followed by an MRC Scale and Tile Tag Generation stage 44. The Segmentation stage 24 can operate in one of two mutually exclusive modes: Scan Segmentation 24 or PDL Segmentation 26.

The primary input to the Scan Segmentation Module 24 is Src 20. It also utilizes an 8-bit screen magnitude estimate signal SCM 22, which is further detailed in U.S. Pat. No. 7,375,856, which is incorporated by reference herein in its entirety. The Scan Segmentation Module 24 outputs the full-color (raw) Foreground and Background planes Fgr 30 and Bgr 28, and (possibly super sampled) Sel 32, which is exported by the module 24.

In PDL mode 40, the PDL Segmentation Module 26 does not use SCM 22, but instead may use the signal Rht 34, which captures hint information from the PDL interpreter and will be encoded into a CEF Hint plane Hnt 38. The output from the PDL Segmentation Module 26 includes the full-color (raw) Foreground and Background planes Fgr 30 and Bgr 28, the binary Selector plane Sel 32, and possibly the Hint plane Hnt 38 when hints are present. As indicated above, the Hint plane can be 1-bit or 8-bit deep.

The Src 20 image for Scan mode 42, and PDL mode 40 typically have been processed differently. The Scan Segment Module 24 relies on the input being de-screened. This is not required for the clean, noise free images directly generated from PDL sources.

For Scan processing, the chroma components of the source input image Src 20 are assumed to be sub-sampled by a factor of 2 in the fast scan (x) direction (XCSS). None of the color images produced by the segmentor will use XCSS. When the chroma samples of the source image are accessed, no 'adjustment' filtering is required. That is for the 4 sample XCSS quad: $L_0A_0L_1B_1$, pixel 0 is $L_0A_0B_1$ and pixel 1 is $L_1A_0B_1$.

The Selector plane Sel output is binary (1 bit deep), and the packed Selector plane Spk packs together 2×2 binary neighboring Selector pixels (4 bits).

For PDL processing, the source input Src 20 is assumed to be a full-color image where the chroma channels are typically not sub-sampled, and therefore are at the same resolution as the luminance channel.

In general, the exported Foreground, Background, and Selector planes could all be at different resolutions relative to the input image. For example, the Foreground and Background planes are typically down-sampled while the Selector plane may be up-sampled from the original input resolution. The amount of up or down sampling is programmable under software control.

The MRC Scale and Tile Tag Generation Module 44 reads in the initial (raw) Background Bgr 28, Foreground Fgr 30, Selector Sel 32, and the optional Hints Hnt 38 if any exist (PDL mode only). It produces the final color MRC layers: Background Bgd 46 and Foreground Fgd 48, by subsampling and filling in the 'holes' or previously unassigned pixels in the raw images. In addition, the MRC Scale and Tile Tag Generation Module 44 generate four associated Tile Tag signals for the Background Ttb 50, Foreground Ttf 52, Selector Tts 53, and optional Rendering Hints Tth 54 if any exist (PDL mode only). The Tile Tag is one binary bit per tile (or strip) indicating whether the current tile may be altogether omitted. This further reduces the overall file size. Missing tiles are automatically filled to pre-defined default color for each plane.

The Scan Segmentation Module 24 is responsible for performing the MRC segmentation into three planes in the case of scanned documents. The inputs to the Scan Segmentation Module include the input color signal Src 20 and the 8-bit screen magnitude estimate signal SCM 22. The Scan Segmentation Module 24 outputs the full-color (raw) Foreground and Background planes Fgr 28 and Bgr 30, and the Selector Sel 32 plane.

Figure 3:
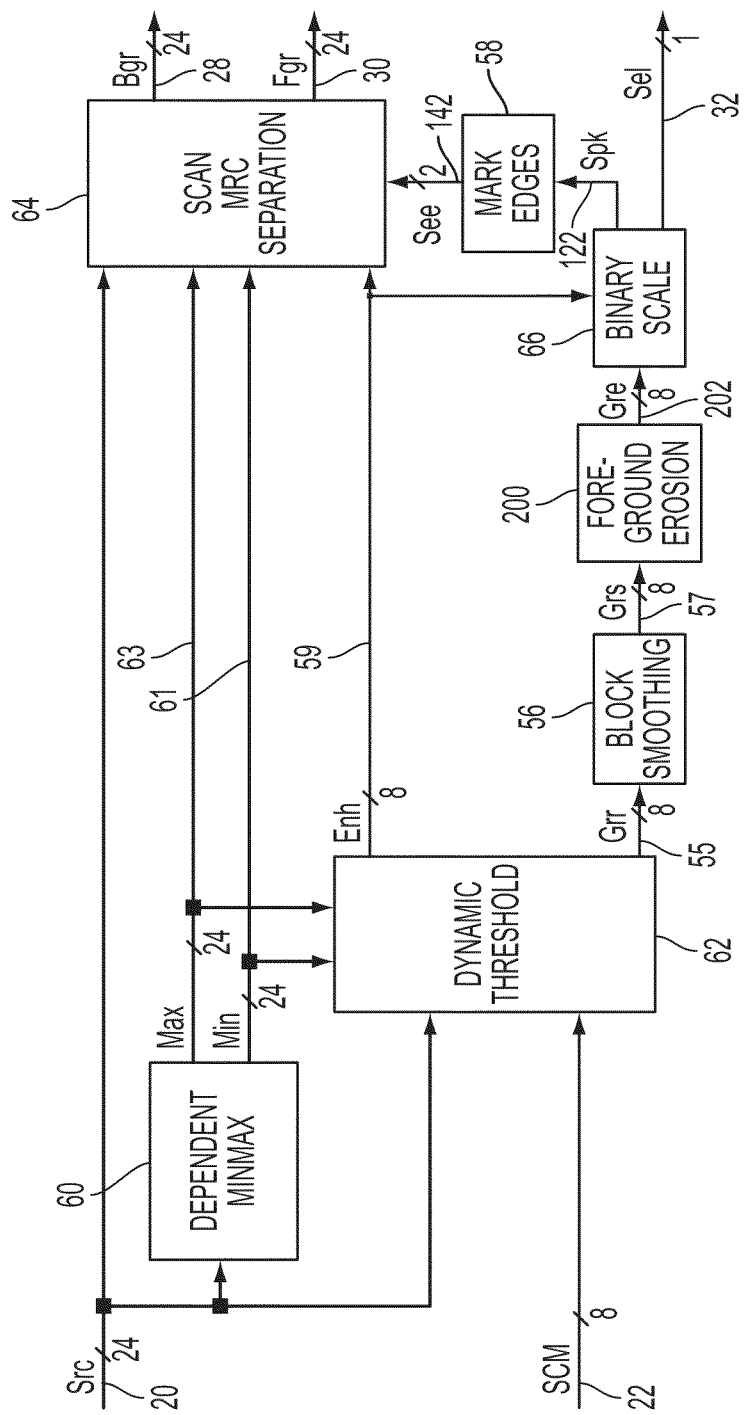
FIG. 3 is a block diagram of the Scan Segment Module.

The block diagram of the Scan Segmentation Module 24 is shown in FIG. 3. The following is a brief description of the various modules comprising the Scan Segmentation Module 24. The color input signal Src 20 is forwarded to the Dependent Min-Max Module 60, which searches in a 8×8 window centered on the current pixel of interest for the minimum Min and maximum Max color values for dynamic thresholding.

The minimum Min 61 and maximum Max 63 values are forwarded to the Dynamic Threshold Module 62 and the Scan MRC Separation Module 64. The Dynamic Threshold Module 62 also uses the input color image Src 20 and the 8-bit Screen Magnitude estimate signal SCM 22. A Dynamic Threshold Module 62 outputs the monochrome 8-bit signal Grr 55, the biased zero crossings of which represent the locations of edges in the Selector planes. In addition, the Dynamic Threshold Module 62 also generates an 8-bit segmentation enhancement control Enh 59, which is used to communicate to the Scan MRC Separation Module 64, on a pixel-by-pixel basis, if segmentation is to be applied, and if so, how much additional enhancement to apply.

The purpose of the Block Smoothing Unit 56 is to move weak (a.k.a. false) edges away from strong edges to prevent high contrast transitions within the Foreground and Background JPEG minimum coded unit (MCU) blocks. If there are no strong edges nearby, the weak edges are pushed out of the JPEG block to the boundary between neighboring blocks. This process eliminates unnecessary sharp transitions within JPEG blocks, thereby increasing the overall compression and quality. The output from the Block Smoothing Unit 56 is an 8-bit smoothed Grs 57 signal, which represents a smoothed (filtered) version of the incoming signal Grr 55.

The Foreground Erosion Unit 200 is used to meet thin (but unbroken) text requirements using linear YCC segmentation. A fixed value is subtracted from the gray selector, thereby thinning/eroding the foreground. This is only done if a neighborhood test verifies that the thinning will not result in broken lines. The output is a smoothed Gre 202 signal or the Grs 57 signal.

The Binary Scale Unit 66 provides the capability to super-sample the resulting smoothed gray selector signal Grs 57 from the Block Smoothing 56 output. In the normal 1:1 mode, the Grs 57 signal is threshold to produce the binary Selector plane output Sel 32. However, for high-quality text and line-art reproduction, the Selector plane may be super-sampled at twice the input resolution (e.g., at 1200 dpi for a 600 dpi input). The super-sampling of the Selector signal is done by doubling the sampling frequency prior to thresholding. The resulting binary Selector pixels at the higher resolution are packed, four neighborhoods at a time, into the packed Selector signal Spk 122.

The Mark Edge Processing Module 58 takes in the packed high resolution Selector output Spk 122 and counts the number of on and off pixels in a 5×5 [high-resolution] window centered on the current [low-resolution] pixel of interest. The output from the Mark Edge Processing Module 58 is the two-bit signal See 142. The See signal 142 is set to 0 if all of the input pixels inside the 5×5 window are off (corresponding to a 3×3 constant background area). Similarly, the See signal 142 is set to 3 if all of the input pixels inside the window are on (corresponding to a 3×3 constant foreground area). In addition, the See output is set to 1 or 2 if the 5×5 window is mostly background or mostly foreground, respectively.

Finally, the Scan MRC Separation Module 64 takes in the full color source signal Src 20 to be segmented as well as the color minimum and maximum (Min, Max) from the Dependent Min-Max Module 60. In addition, the MRC Separation Module 24 uses the See signal 142 from the Mark Edge Processing Module 58, and the segmentation and enhancement signal Enh 59 from the Dynamic Threshold Module 62. The MRC Separation Module 64 actually produces the two full-color outputs Fgr 24 and Bgr 30 as the rough estimates of the Foreground and Background planes, respectively.

Figure 4:
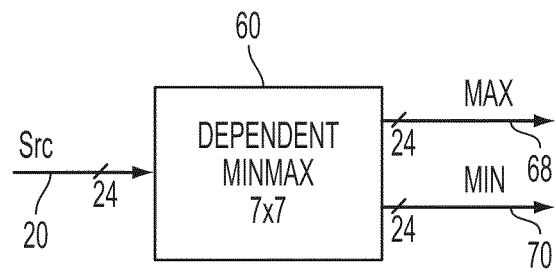
FIG. 4 is a block diagram of the Dependent Min-Max Module.
Figure 5:
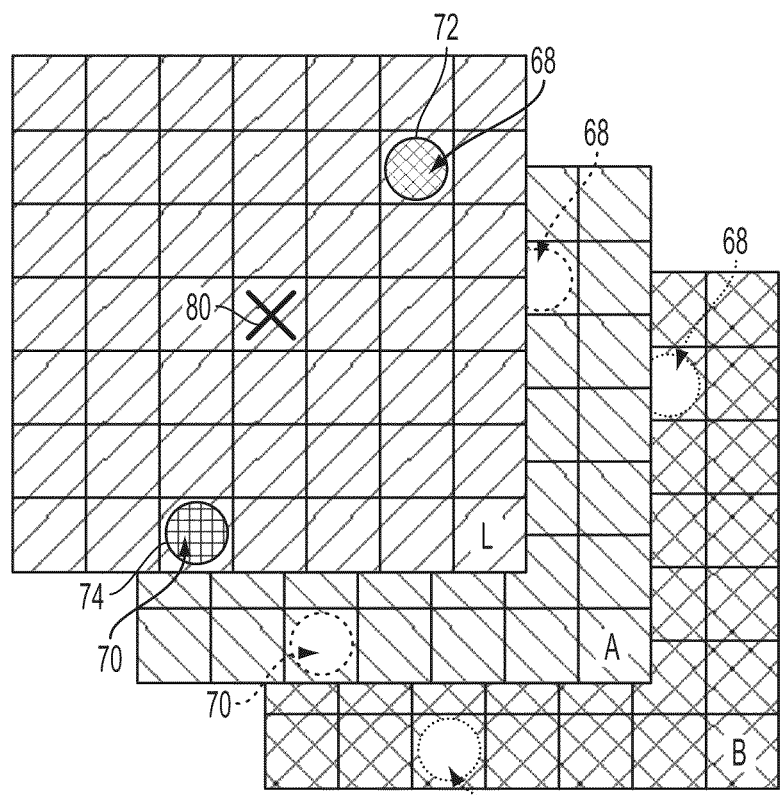
FIG. 5 illustrates the operation of the Dependent Min-Max Module.

A block diagram of the Dependent Min-Max Module is shown in FIG. 4. The Dependent Min-Max Module 60 inputs the Src signal 20 and examines an 8×8 window centered on the pixel of interest 80 (as shown in FIG. 5) to find the max L and min L pixels, L being the luminance channel. The Max output 68 (as shown in FIG. 5) is the pixel that has the max L 72 (as shown in FIG. 5). The Min output 70 (as shown in FIG. 5) is the pixel that has the min L 74 (as shown in FIG. 5). The resulting chroma values are therefore dependent on the locations of where the extreme luminance values were found.

The operation of the Dependent Min-Max Module 60 is illustrated in FIG. 5. The operation proceeds in two steps. In the first step, the Dependent Min-Max Module 60 searches across the window for the largest 68 and smallest 70 samples of the luminance component L. In other words, the minimum and maximum for each pixel based on an 8×8 neighborhood around that pixel is calculated. It uses a sliding window technique to do so. Once the locations of the minimum 74 and maximum luminance 72 values are found, they are output along with the chroma components (A, B) at these locations. Even though the Src signal 20 arrives at this module with X subsampled chroma components, this is the point at which the X chroma subsampling ceases. That is, the Max and Min color signals do not have X sub-sampled chrominance.

This filtering operation is separable. For instance the Min/Max of individual columns can be computed first, and then the final Min 74 can be computed by finding the column Min pixel that has the minimum L. This means that the incremental work required as the window in stepped across the Src image amounts to computing one 8 high column and one 8 wide row for both the Min and the Max outputs.

The Dynamic Threshold Module 62 applies adaptive thresholding to the incoming color source signal Src 20 to generate a raw signed 8-bit gray selector signal Grr output 55, whose zero crossings represent the transitions of the Selector plane. Gray selector values>=0 mark pixels which will have selector values of 1 and be placed in the foreground. Gray selector values<0 mark pixels which will be placed in the background. The Dynamic Threshold Module 60 utilizes the pair of dependent min/max values (Min, Max) 61 and 63 respectively from the Dependent Min-Max Module 60, as well as the 8-bit screen magnitude estimate signal Scm 22 from the Screen Estimation Module (SEM). The Dynamic Threshold Module 62 also produces the 8-bit signal Enh 59. The Enh signal 59 is communicated to the Scan MRC Separation Module 64 to determine how much enhancement to apply as pixels are placed in the background and/or foreground planes.

The Dynamic Threshold Module 62 operates in three segmentation modes: dynamic threshold, static threshold, and force-to-foreground. Static thresholding is applied when the image is smooth (unchanging). Force-to-foreground mode is enabled for halftone images. Strong decisions are only produced in the Dynamic thresholding mode and only Strong decisions may have non-zero Enh codes. Both Static thresholding and force-to-foreground modes only produce Weak decisions. While the strong decisions (e.g., non-zero Enh codes) provide information about the edges, the weak decisions (e.g., zero Enh codes) provide information about non-edge areas of the image.

The Dynamic Threshold Module 62 and various other modules of the Scan Segmentation Module are described in further detail in U.S. Pat. No. 7,242,802, which is incorporated by reference herein in its entirety and will not be described in detail here.

The present disclosure provides a method and a system for detecting edge pixels in an image plane based on intensity and neutrality of a current pixel, when separating an image signal into a set of image planes. The method includes searching, via a min-max module 60 (as shown in FIG. 3), for a minimum value and a maximum value of a specified characteristic within at least one predefined neighborhood pixel window centered on a current pixel in the image signal; and detecting, via a dynamic threshold module 62 (as shown in FIG. 3), the edge pixels in the image plane based on a predetermined criteria. The predefined neighborhood pixel window includes the edge pixels. The predetermined criteria for detecting the edge pixels includes determining whether: (a) an absolute difference between the maximum value and the minimum value of the specified characteristic is greater than or equal to a predetermined threshold; and (b) (i) an absolute difference between a current value and the minimum value of the specified characteristic, or (ii) an absolute difference between a current value and the maximum value of the specified characteristic is greater than or equal to a predetermined threshold. The predetermined thresholds are determined based on intensity and neutrality of the current pixel. In one embodiment, the predetermined thresholds may vary for three channels, that is, a luminance channel, a chrominance channel A and a chrominance channel B.

A pixel of interest (e.g., current pixel) includes three components, namely, a luminance component that represents luminance or lightness, and two chrominance components that represent red-green and yellow-blue variations, respectively. The two chrominance components (i.e., that represent red-green and yellow-blue variations) correspond to the chrominance value of channel A of the current pixel and the chrominance value of channel B of the current pixel, respectively.

The predefined neighborhood pixel window represents a window centered on a pixel of interest (e.g., current pixel). The predefined neighborhood pixel window may be N×N window, where N is variable. The predefined neighborhood pixel window may be an 8×8 window. Alternatively, the predefined neighborhood pixel window may be a 7×7 window.

As noted above, the dependent Min-Max Module 60 determines the maximum luminance value in the predefined neighborhood pixel window. The dependent Min-Max Module 60 examines the predefined neighborhood pixel window centered on the pixel of interest 80 (as shown in FIG. 5) to find the maximum luminance value in the predefined neighborhood pixel window.

Generally, an image may include shadow regions (i.e., darker areas of the image), midtone regions (i.e., middle ranged tone areas of the image), and highlight regions (i.e., brighter areas of the image). The image may be further classified based on neutrality of the current pixel into neutral and non-neutral regions as described below. The method in accordance with an embodiment of the present disclosure is not only used for the black pixels, and the white pixels, but also used for the other neutral and non-neutral pixels that exist in the shadow regions, the midtone regions, and the highlight regions of the image.

The neutrality of the current pixel is dependent on the chrominance value of the first chrominance channel, and the chrominance value of the second chrominance channel. The neutrality of the current pixel is determined based on how far the chrominance value of the first chrominance channel and the chrominance value of the second chrominance channel are from a neutral value (i.e., generally a value of 128 in most of the color spaces). If either the chrominance value of the first chrominance channel or the chrominance value of the second chrominance channel is too far off from the neutral within the predetermined threshold range, the pixel may then be identified as a non-neutral pixel, where the predetermined threshold range may vary based on the intensity of the current pixel.

The intensity of the current pixel is dependent on the luminance value of the luminance channel. Intensity of luminance channel may refer to the range of values it falls in (e.g., on a range from 0 to 255).

For example, if the luminance value of the luminance channel for the current pixel is less than a predetermined threshold (i.e., a value of 50), then the pixel may be identified as a black or shadow region pixel. That is, if the luminance value of the luminance channel for the current pixel is less than a predetermined threshold (i.e., a value of 50), then based on the neutrality of the chrominance value of the first chrominance channel and the chrominance value of the second chrominance channel, the pixel may be identified as a pixel either in the black or neutral and non-neutral shadow regions.

If the luminance value of the luminance channel for the current pixel is within a predetermined threshold (i.e., falling with a range of 50-160), then the pixel may be identified as a pixel in the non-neutral, lower midtone or neutral gray region.

That is, if the luminance value of the luminance channel for the current pixel is within a predetermined threshold (i.e., falling with a range of 50-160), then based on the neutrality of the chrominance value of the first chrominance channel and the chrominance value of the second chrominance channel, the pixel may be identified as a pixel either in the non-neutral, lower midtone or neutral gray region.

If the luminance value of the luminance channel for the current pixel is within a predetermined threshold (i.e., falling with a range of 160-220), then the pixel may be identified as a pixel in the neutral gray or non-neutral, upper midtone region. That is, if the luminance value of the luminance channel for the current pixel is within a predetermined threshold (i.e., falling with a range of 160-220), then based on the neutrality of the chrominance value of the first chrominance channel and the chrominance value of the second chrominance channel, the pixel may be identified as a pixel either in the neutral gray or non-neutral, upper midtone region.

If the luminance value of the luminance channel for the current pixel is within a predetermined threshold (i.e., a value close to 255 ranging from 220 to 255), then the pixel may be identified as a pixel in the neutral white or non-neutral highlight region. That is, if the luminance value of the luminance channel for the current pixel is within a predetermined threshold (i.e., a value close to 255), then based on the neutrality of the chrominance value of the first chrominance channel and the chrominance value of the second chrominance channel, the pixel may be identified as a pixel either in the neutral white or non-neutral highlight region.

The method first determines whether the current pixel is a black pixel, a white pixel, or whether the current pixel is a neutral or non-neutral pixel in the shadow regions, the midtone regions, or the highlight regions of the image. The method then determines whether (a) an absolute difference between the maximum value and the minimum value of the specified characteristic is very high, and (b) (i) an absolute difference between a current value and the minimum value of the specified characteristic is very high, or (ii) an absolute difference between a current value and the maximum value of the specified characteristic is very high. If these two conditions are satisfied, the method then determines that the current pixel is an edge pixel.

In one embodiment, the method is configured to separately determine whether the absolute difference between the maximum value and the minimum value of each specified characteristic is very high. Similarly, in one embodiment, the method is configured to separately determine whether the absolute difference between a current value and the minimum value of each specified characteristic is very high, or (ii) an absolute difference between a current value and the maximum value of each specified characteristic is very high. In one embodiment, the specified characteristics may include the luminance value of the luminance channel, the chrominance value of the chrominance channel A, and the chrominance value of chrominance channel B.

In one embodiment, in addition to the maximum and the minimum values of the specified characteristic, the method takes into account the current pixel value of the specified characteristic. This condition (i.e., where the method takes into account the current pixel value of the specified characteristic) serves as an additional edge finding condition and is used for further fine tuning the method for avoiding detection of false edge pixels.

Figure 6:
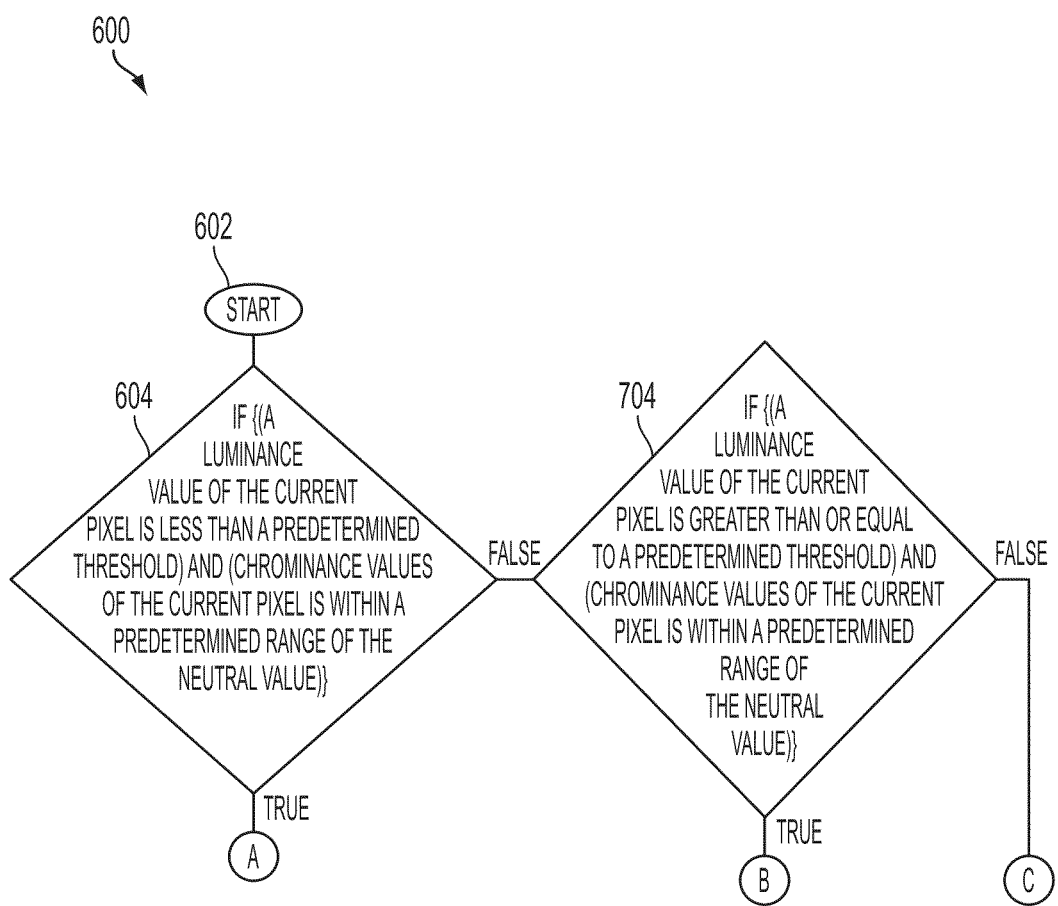
FIG. 6 illustrates a method for detecting edge pixels in an image plane in accordance with an embodiment of the present disclosure.

FIG. 6 illustrates a method 600 for detecting edge pixels in an image plane in accordance with an embodiment of the present disclosure. The method 600 begins at procedure 602. At procedure 604, a controller determines whether the current pixel is a black pixel, or a neutral pixel in the shadow region of the image. In other words, the controller, at procedure 604, is configured to determine whether a black color pixel identification criteria is satisfied. The black color pixel identification criteria includes: a) chrominance value of channel A of the current pixel is within a predetermined range including the neutral value, b) chrominance value of channel B of the current pixel is within a predetermined range including the neutral value, and c) luminance value of the current pixel of interest is less than a predetermined threshold.

In one embodiment, in order to determine whether the chrominance value of channel A of the current pixel is within a predetermined range including the neutral value, the controller uses the following formula:

$$\text{absolute}(\text{chrom\_}A-128) < \text{Neutral\_THR} \quad (604a)$$

where:
- chrom_A is a chrominance value of channel A of the current pixel of interest;
- 128 is a neutral value for most color spaces, wherein the neutral value is a midpoint of a range of color intensity values (e.g., ranging from 0-255); and
- Neutral_THR is a predetermined threshold for the chrominance value of channel A to measure whether the chrominance value of channel A of the current pixel of interest is within a predetermined range including the neutral value.

In other words, the controller determines the difference between the chrominance value of channel A of the current pixel and a neutral value (e.g., "128"). The controller then determines the absolute value of the calculated difference. The controller then determines whether the absolute value of the calculated difference is less than a constant, Neutral_THR, in order, to determine whether the chrominance value of channel A of the current pixel is within a predetermined range including a neutral value.

Similarly, in one embodiment, in order to determine whether the chrominance value of channel B of the current pixel is within a predetermined range including the neutral value, the controller uses the following formula:

$$\text{absolute}(\text{chrom\_}B-128) < \text{Neutral\_THR} \quad (604b)$$

where:
- chrom_B is a chrominance value of channel B of the current pixel of interest;
- 128 is a neutral value for most color spaces, wherein the neutral value is a midpoint of a range of color intensity values (e.g., ranging from 0-255); and
- Neutral_THR is a predetermined threshold for the chrominance value of channel B to measure whether the chrominance value of channel B of the current pixel of interest is within a predetermined range including the neutral value.

In other words, the controller determines the difference between the chrominance value of channel B of the current pixel and a neutral value (e.g., "128"). The controller then determines the absolute value of the difference calculated. The controller then determines whether the absolute value of the calculated difference is less than a constant, Neutral_THR, in order to determine whether the chrominance value of channel B of the current pixel is within a predetermined range including a neutral value.

In the following detailed description reference is made to image data having a gray value in a range between 0 and 255, wherein a gray level of 0 represents black and a gray level of 255 represents white. However it should be appreciated that any range of gray levels may be used and is not limited to the range of 0 to 255. Additionally, it should be appreciated that the values can be "reversed" such that 0 corresponds to white and 255 corresponds to black. The neutral value is a midpoint of a range of color intensity values (e.g., ranging from 0-255), and is equal to 128.

The value of Neutral_THR may generally range from 5 to 20. In one embodiment, Neutral_THR may generally have a value of 10 or 15. In one embodiment, when the method for detecting the edge pixels is generally used for black pixels (i.e., not for all the pixels in the shadow regions of the image), Neutral_THR may generally have a value close to 0.

In one embodiment, in order to determine whether the luminance value of the current pixel is less than a predetermined threshold, the controller uses the following formula:

$$\text{lum} < \text{LumTHRO} \quad (604c)$$

where:
lum is luminance value of the current pixel of interest; and
LumTHRO is a predetermined threshold of the luminance value of the current pixel.

The value of LumTHRO may generally range from 0 to 100. In one embodiment, LumTHRO may generally have a value of 40 or 50 to cover all the shadow region pixels. These shadow region pixels may be further subdivided into black region pixels (i.e., pixels very close to a value of zero) and shadow region pixels (i.e., pixels having a value that falls within the range from a value of zero to the value of LumTHRO). In one embodiment, the black region pixels and the shadow region pixels may include separate threshold values.

The shadow regions pixels may be further subdivided into neutral region pixels and non-neutral region pixels. In one embodiment, the neutral region pixels and the non-neutral region pixels may include separate threshold values.

Figure 7:
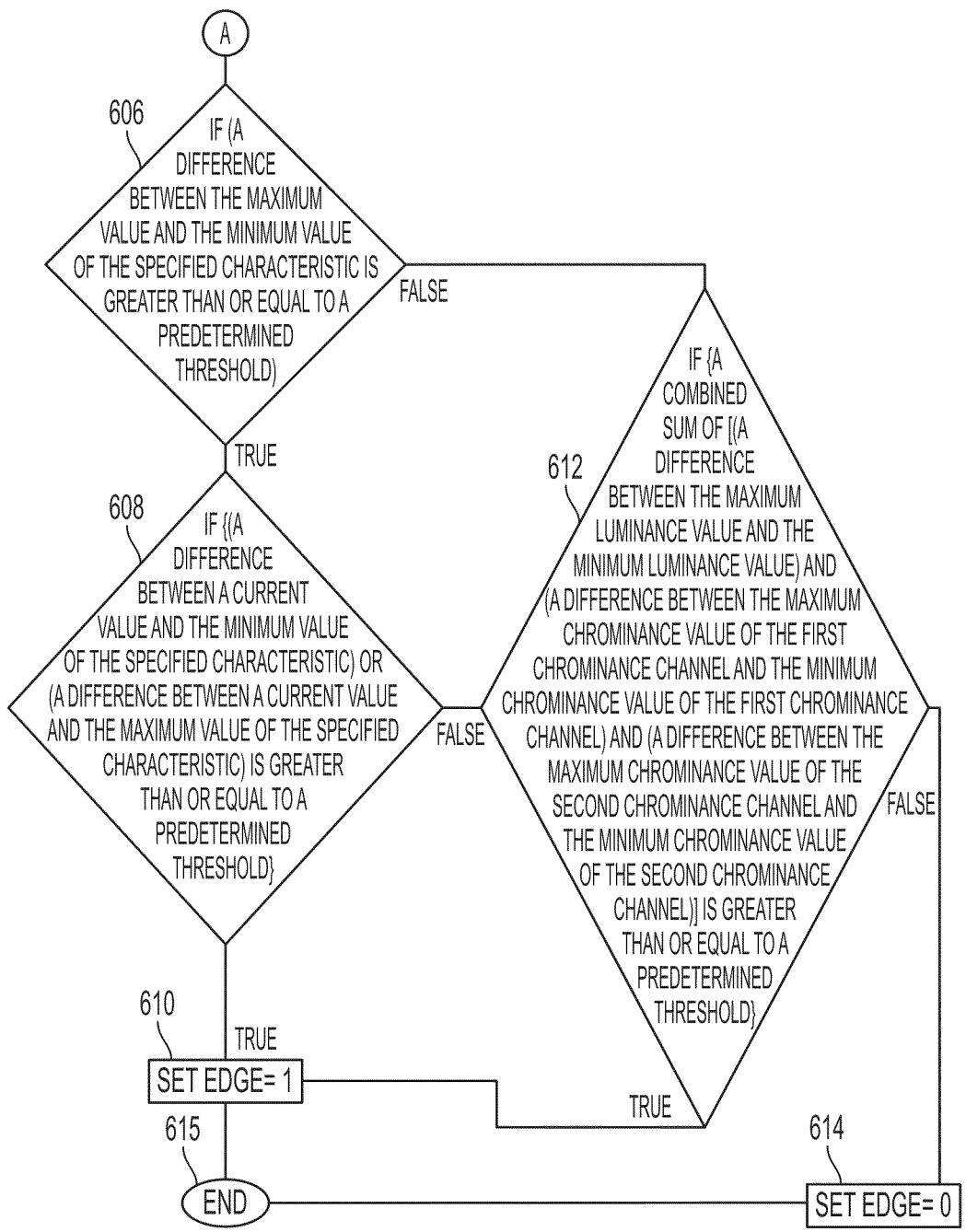
FIG. 7 illustrates the method for detecting edge pixels in the image plane, wherein a current pixel of interest is either a black pixel or a pixel in shadow regions of an image in accordance with an embodiment of the present disclosure.

FIG. 7 illustrates the method for detecting edge pixels in the image plane, wherein a current pixel of interest is either a black pixel or a pixel in shadow regions of an image in accordance with an embodiment of the present disclosure.

Next, at procedure 606, the controller determines whether an absolute difference between the maximum and the minimum value of the specified characteristic is greater than or equal to a predetermined threshold, if the conditions (i.e., the equations 604a, 604b, and 604c) at procedure 604 are satisfied. In other words, the controller, at procedure 606, determines whether a) the absolute difference between the maximum luminance value in the predefined neighborhood pixel window and the minimum luminance value in the predefined neighborhood pixel window is greater than or equal to a predetermined threshold, b) the absolute difference between the maximum chrominance value of channel A in the predefined neighborhood pixel window and the minimum chrominance value of channel A in the predefined neighborhood pixel window is greater than or equal to a predetermined threshold, or c) the absolute difference between the maximum chrominance value of channel B in the predefined neighborhood pixel window and the minimum chrominance value of channel B in the predefined neighborhood pixel window is greater than or equal to a predetermined threshold, if the conditions (i.e., the equations 604a, 604b, and 604c) at procedure 604 are satisfied.

In one embodiment, in order to determine whether the absolute difference between the maximum luminance value in the predefined neighborhood pixel window and the minimum luminance value in the predefined neighborhood pixel window is greater than or equal to a predetermined threshold, the controller uses the following formula:

$$\text{absolute}(\text{lum\_max} - \text{lum\_min}) >= \text{DIFF\_THR} \quad (606a)$$

where:
lum_max is the maximum luminance value in the predefined neighborhood pixel window;
lum_min is the minimum luminance value in the predefined neighborhood pixel window; and
DIFF_THR is a predetermined threshold for the luminance value.

In other words, the controller determines the difference between the maximum luminance value in the predefined neighborhood pixel window and the minimum luminance value in the predefined neighborhood pixel window. The controller then determines the absolute value of the calculated difference. The controller then determines whether the absolute value of the calculated difference is greater than or equal to a constant, DIFF_THR. The value of DIFF_THR may generally range from 0 to 100. In one embodiment, DIFF_THR may generally have a value of 10 or 15.

In one embodiment, in order to determine whether the absolute difference between the maximum chrominance value of channel A in the predefined neighborhood pixel window and the minimum chrominance value of channel A in the predefined neighborhood pixel window is greater than or equal to a predetermined threshold, the controller uses the following formula:

$$\text{absolute}(\text{chrom\_}A\text{\_max} - \text{chrom\_}A\text{\_min}) >= \text{DIFF\_THR} \quad (606b)$$

Where:
chrom_A_max is the maximum chrominance value of channel A in the predefined neighborhood pixel window;
chrom_A_min is the minimum chrominance value of channel A in the predefined neighborhood pixel window; and
DIFF_THR is a predetermined threshold for the chrominance value of channel A value.

In other words, the controller determines the difference between the maximum chrominance value of channel A in the predefined neighborhood pixel window and the minimum chrominance value of channel A in the predefined neighborhood pixel window. The controller then determines the absolute value of the calculated difference. The controller then determines whether the absolute value of the calculated difference is greater than or equal to a constant, DIFF_THR. The value of DIFF_THR may generally range from 0 to 100. In one embodiment, DIFF_THR may generally have a value of 10 or 15.

In one embodiment, in order to determine whether the absolute difference between the maximum chrominance value of channel B in the predefined neighborhood pixel window and the minimum chrominance value of channel B in the predefined neighborhood pixel window is greater than or equal to a predetermined threshold, the controller uses the following formula:

$$\text{absolute}(\text{chrom\_}B\text{\_max} - \text{chrom\_}B\text{\_min}) >= \text{DIFF\_THR} \quad (606c)$$

Where:
chrom_B_max is the maximum chrominance value of channel B in the predefined neighborhood pixel window;
chrom_B_min is the minimum chrominance value of channel B in the predefined neighborhood pixel window; and
DIFF_THR is a predetermined threshold for the chrominance value of channel B value.

In other words, the controller determines the difference between the maximum chrominance value of channel B in the predefined neighborhood pixel window and the minimum chrominance value of channel B in the predefined neighborhood pixel window. The controller then determines the absolute value of the calculated difference. The controller then determines whether the absolute value of the calculated difference is greater than or equal to a constant, DIFF_THR. The value of DIFF_THR may generally range from 0 to 100. In one embodiment, DIFF_THR may generally have a value of 10 or 15.

In one embodiment, DIFF_THR may have a same threshold value for the luminance channel, the chrominance channel A, and the chrominance channel B. In another embodiment, DIFF_THR may have different threshold values for the luminance channel, the chrominance channel A, and the chrominance channel B.

If any one of three conditions (i.e., equations 606a, 606b or 606c) at procedure 606 is satisfied, the method 600 proceeds to procedure 608. At procedure 608, the controller determines whether (i) an absolute difference between a current value and the minimum value of the specified characteristic, or (ii) an absolute difference between a current value and the maximum value of the specified characteristic is greater than or equal to a predetermined threshold. In other words, the controller, at procedure 608, determines whether (i) an absolute difference between the luminance value of the current pixel and the maximum luminance value in the predefined neighborhood pixel window, or an absolute difference between the luminance value of the current pixel and the minimum luminance value in the predefined neighborhood pixel window is greater than or equal to a predetermined threshold, (ii) an absolute difference between the chrominance value of channel A of the current pixel and the maximum chrominance value of channel A in the predefined neighborhood pixel window, or a difference between the chrominance value of channel A of the current pixel and the minimum chrominance value of channel A in the predefined neighborhood pixel window is greater than or equal to a predetermined threshold, or (iii) an absolute difference between the chrominance value of channel B of the current pixel and the maximum chrominance value of channel B in the predefined neighborhood pixel window, or an absolute difference between the chrominance value of channel B of the current pixel and the minimum chrominance value of channel B in the predefined neighborhood pixel window is greater than or equal to a predetermined threshold.

In one embodiment, in order to determine whether the absolute difference between the luminance value of the current pixel and the maximum luminance value in the predefined neighborhood pixel window, or an absolute difference between the luminance value of the current pixel and the minimum luminance value in the predefined neighborhood pixel window is greater than or equal to a predetermined threshold, the controller uses the following formula:

$$\{\text{absolute}(lum-lum\_max) \text{ or absolute}(lum-lum\_min)\} \geq \text{MIN\_MAX\_THR} \quad (608a)$$

where:
lum is a luminance value of the current pixel of interest;
lum_max is the maximum luminance value in the predefined neighborhood pixel window;
lum_min is the minimum luminance value in the predefined neighborhood pixel window; and
MIN_MAX_THR is a predetermined threshold for the luminance value.

In other words, the controller determines the difference between the luminance value of the current pixel and the maximum luminance value in the predefined neighborhood pixel window, and a difference between the luminance value of the current pixel and the minimum luminance value in the predefined neighborhood pixel window. The controller then determines the absolute values of the calculated differences. The controller then determines whether the at least one of the absolute values is greater than or equal to a constant, MIN_MAX_THR. The value of MIN_MAX_THR may generally range from 0 to 100. In one embodiment, MIN_MAX_THR may generally have a value of 7 or 8. In one embodiment, the values of MIN_MAX_THR may be chosen carefully to avoid false edge detection. For example, MIN_MAX_THR is less than DIFF_THR, and MIN_MAX_THR is close to the value of DIFF_THR. As an example, if DIFF_THR is 10, then MIN_MAX_THR may have a value in the range of 7-8.

In one embodiment, in order to determine whether the absolute difference between the chrominance value of channel A of the current pixel and the maximum chrominance value of channel A in the predefined neighborhood pixel window, or the absolute difference between the chrominance value of channel A of the current pixel and the minimum chrominance value of channel A in the predefined neighborhood pixel window is greater than or equal to a predetermined threshold, the controller uses the following formula:

$$\{\text{absolute}(chrom\_A-chrom\_A\_max) \text{ or absolute}(chrom\_A-chrom\_A\_min)\} \geq \text{MIN\_MAX\_THR} \quad (608b)$$

where:
chrom_A is a chrominance value of channel A of the current pixel of interest;
chrom_A_max is the maximum chrominance value of channel A in the predefined neighborhood pixel window;
chrom_A_min is the minimum chrominance value of channel A in the predefined neighborhood pixel window; and
MIN_MAX_THR is a predetermined threshold for the chrominance value of channel A value.

In other words, the controller determines the difference between the chrominance value of channel A of the current pixel and the maximum chrominance value of channel A in the predefined neighborhood pixel window, and a difference between the chrominance value of channel A of the current pixel and the minimum chrominance value of channel A in the predefined neighborhood pixel window. The controller then determines the absolute values of the calculated differences. The controller then determines whether the at least one of the absolute values is greater than or equal to a constant, MIN_MAX_THR. The value of MIN_MAX_THR may generally range from 0 to 100. In one embodiment, MIN_MAX_THR may generally have a value of 7 or 8.

In one embodiment, in order to determine whether the absolute difference between the chrominance value of channel B of the current pixel and the maximum chrominance value of channel B in the predefined neighborhood pixel window or the absolute difference between the chrominance value of channel B of the current pixel and the minimum chrominance value of channel B in the predefined neighborhood pixel window is greater than or equal to a predetermined threshold, the controller uses the following formula:

$$\{\text{absolute}(chrom\_B-chrom\_B\_max) \text{ or absolute}(chrom\_B-chrom\_B\_min)\} \geq \text{MIN\_MAX\_THR} \quad (608c)$$

where:

chrom_B is a chrominance value of channel B of the current pixel of interest;

chrom_B_max is the maximum chrominance value of channel B in the predefined neighborhood pixel window;

chrom_B_min is the minimum chrominance value of channel B in the predefined neighborhood pixel window; and MIN_MAX_THR is a predetermined threshold for the chrominance value of channel B value.

In other words, the controller determines the difference between the chrominance value of channel B of the current pixel and the maximum chrominance value of channel B in the predefined neighborhood pixel window, and a difference between the chrominance value of channel B of the current pixel and the minimum chrominance value of channel B in the predefined neighborhood pixel window. The controller then determines the absolute values of the calculated differences. The controller then determines whether the at least one of the absolute values is greater than or equal to a constant, MIN_MAX_THR. The value of MIN_MAX_THR may generally range from 0 to 100. In one embodiment, MIN_MAX_THR may generally have a value of 7 or 8.

In one embodiment, the value of MIN_MAX_THR may be less than the value of DIFF_TH. In one embodiment, when the value of DIFF_THR is 10, the value of MIN_MAX_THR may be 7 or 8.

If any one of three conditions (i.e., equations 608a, 608b or 608c) at procedure 608 is satisfied, the method 600 proceeds to procedure 610. At procedure 610, the controller assigns the value of edge pixel as 1 (i.e., determines that the current pixel is an edge pixel). In other words, if any one of the three conditions (i.e., equations 606a, 606b or 606c) at procedure 606 and any one of the three conditions (i.e., equations 608a, 608b or 608c) are satisfied, then the controller, at procedure 610, assigns the value of edge pixel as 1 (i.e., determines that the current pixel is an edge pixel). The method 600 ends at procedure 615.

If none of three conditions (i.e., equations 606a, 606b or 606c) at procedure 606 is satisfied, the controller, at procedure 612, determines whether a second predetermined criteria is satisfied. If none of three conditions (i.e., equations 608a, 608b or 608c) at procedure 608 is satisfied, the controller, at procedure 612, determines whether the second predetermined criteria is satisfied.

The second predetermined criteria includes determining whether combined sum of (a) an absolute difference between the maximum luminance value and the minimum luminance value; (b) an absolute difference between the maximum chrominance value of the first chrominance channel and the minimum chrominance value of the first chrominance channel; and (c) an absolute difference between the maximum chrominance value of the second chrominance channel and the minimum chrominance value of the second chrominance channel, is greater than or equal to a predetermined threshold.

In one embodiment, in order to determine whether the combined sum of (a) an absolute difference between the maximum luminance value and the minimum luminance value; (b) an absolute difference between the maximum chrominance value of the first chrominance channel and the minimum chrominance value of the first chrominance channel; and (c) an absolute difference between the maximum chrominance value of the second chrominance channel and the minimum chrominance value of the second chrominance channel, is greater than or equal to a predetermined threshold, the controller uses the following formula:

$$\{absolute(lum\_max-lum\_min)+absolute(chrom\_A\_max-chrom\_A\_min)+absolute(chrom\_B\_max-chrom\_B\_min)\} >= (SegLumClrConThr-DeltaBlack) \quad (612)$$

where:

lum_max is the maximum luminance value in the predefined neighborhood pixel window;

lum_min is the minimum luminance value in the predefined neighborhood pixel window;

chrom_A_max is the maximum chrominance value of channel A in the predefined neighborhood pixel window;

chrom_A_min is the minimum chrominance value of channel A in the predefined neighborhood pixel window;

chrom_B_max is the maximum chrominance value of channel B in the predefined neighborhood pixel window;

chrom_B_min is the minimum chrominance value of channel B in the predefined neighborhood pixel window; and SegLumClrConThr is a predetermined threshold.

DeltaBlack is a predetermined threshold.

The value of SegLumClrConThr may generally range from 0 to 120. In one embodiment, SegLumClrConThr may generally have a value of 70 or 90.

The value of DeltaBlack may range from 0 to the value of SegLumClrConThr. The value of DeltaBlack is generally less than SegLumClrConThr. In one embodiment, DeltaBlack may generally have a value of 30 or 40.

If the condition (i.e., the equation 612) at procedure 612 is satisfied, the controller, at procedure 610, assigns the value of edge pixel as 1 (i.e., determines that the current pixel is an edge pixel), and the method 600 ends at procedure 615.

If the condition (i.e., the equation 612) at procedure 612 is not satisfied, the controller, at procedure 614, assigns the value of edge pixel as 0 (i.e., determines that the current pixel is not an edge pixel), and the method 600 ends at procedure 615.

If the conditions (i.e., the equations 604a, 604b, and 604c) at procedure 604 are not satisfied, the controller, at procedure 704, determines whether the current pixel is a neutral white pixel, or a neutral pixel that is in the highlight region of the image. In other words, the controller, at procedure 704, is configured to determine whether a white color pixel identification criteria is satisfied. The white color pixel identification criteria includes determining whether the following conditions are satisfied: a) chrominance value of channel A of the current pixel is within a predetermined range including the neutral value, b) chrominance value of channel B of the current pixel is within a predetermined range including the neutral value, and c) luminance value of the current pixel of interest is greater than or equal to a predetermined threshold.

In one embodiment, the conditions (i.e., determining whether the chrominance value of channel A of the current pixel is within a predetermined range including the neutral value, and whether the chrominance value of channel A of the current pixel is within a predetermined range including the neutral value) at procedure 704 are similar to the conditions (i.e., the equations 604a and 604b) at procedure 606 discussed above, therefore these conditions at procedure 706 are not discussed in detail here.

In one embodiment, in order to determine whether the luminance value of the current pixel is greater than or equal to a predetermined threshold, the controller uses the following formula:

$$lum >= LumTHR1WHITE \quad (704c)$$

where:
lum is luminance value of the current pixel of interest; and
LumTHR1WHITE is a predetermined threshold of the luminance value.

The value of LumTHR1WHITE may generally range from 200 to 255. In one embodiment, LumTHR1WHITE may have a value of 220, 230 or 240.

Figure 8:
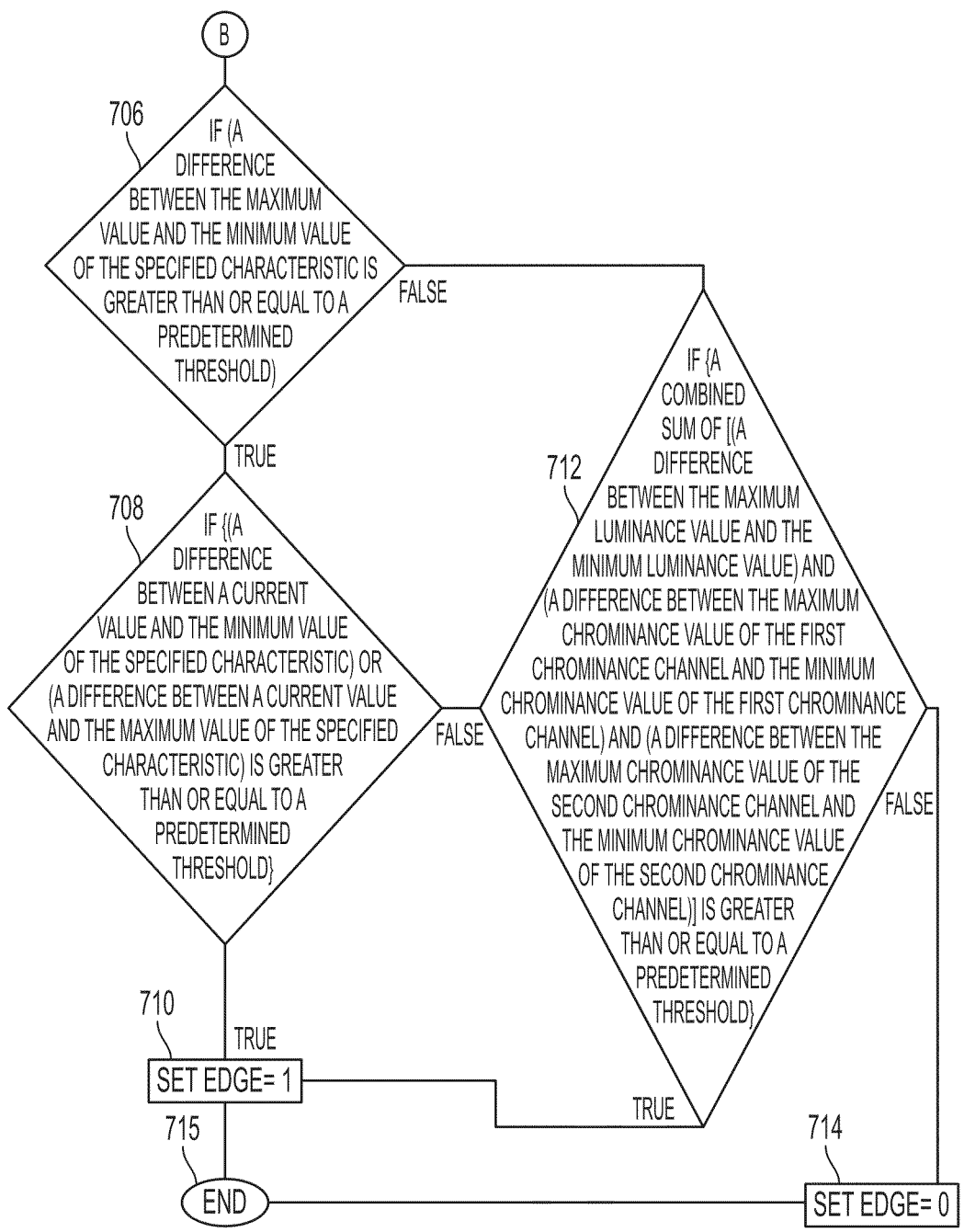
FIG. 8 illustrates the method for detecting edge pixels in the image plane, wherein the current pixel of interest is either a white pixel or a pixel in highlight regions of the image in accordance with an embodiment of the present disclosure.

FIG. 8 illustrates the method for detecting edge pixels in the image plane, wherein the current pixel of interest is either a neutral white pixel or a neutral pixel in highlight regions of the image in accordance with an embodiment of the present disclosure. Next, at procedure 706, the controller determines whether an absolute difference between the maximum and the minimum value of the specified characteristic is greater than or equal to a predetermined threshold, if the conditions at procedure 704 are satisfied. In other words, the controller, at procedure 706, determines whether a) the absolute difference between the maximum luminance value in the predefined neighborhood pixel window and the minimum luminance value in the predefined neighborhood pixel window is greater than or equal to a predetermined threshold, b) the absolute difference between the maximum chrominance value of channel A in the predefined neighborhood pixel window and the minimum chrominance value of channel A in the predefined neighborhood pixel window is greater than or equal to a predetermined threshold, or c) the absolute difference between the maximum chrominance value of channel B in the predefined neighborhood pixel window and the minimum chrominance value of channel B in the predefined neighborhood pixel window is greater than or equal to a predetermined threshold, if the conditions at procedure 704 are satisfied. The predetermined thresholds may be different for three channels, that is, the luminance channel, the chrominance channel A and the chrominance channel B.

The highlight regions pixels may be further subdivided into neutral region pixels and non-neutral region pixels in the highlight region. In one embodiment, the neutral highlight region pixels and the non-neutral highlight region pixels may include separate threshold values.

The conditions at procedure 706 are similar to the conditions at procedure 606 discussed above, therefore the conditions at procedure 706 are not discussed in detail here.

If any one of three conditions at procedure 706 is satisfied, the method 600 proceeds to procedure 708. At procedure 708, the controller determines whether (i) an absolute difference between a current value and the minimum value of the specified characteristic, or (ii) an absolute difference between a current value and the maximum value of the specified characteristic is greater than or equal to a predetermined threshold. In other words, the controller, at procedure 708, determines whether (i) an absolute difference between the luminance value of the current pixel and the maximum luminance value in the predefined neighborhood pixel window or a difference between the luminance value of the current pixel and the minimum luminance value in the predefined neighborhood pixel window is greater than or equal to a predetermined threshold, (ii) an absolute difference between the chrominance value of channel A of the current pixel and the maximum chrominance value of channel A in the predefined neighborhood pixel window or a difference between the chrominance value of channel A of the current pixel and the minimum chrominance value of channel A in the predefined neighborhood pixel window is greater than or equal to a predetermined threshold, or (iii) an absolute difference between the chrominance value of channel B of the current pixel and the maximum chrominance value of channel B in the predefined neighborhood pixel window or an absolute difference between the chrominance value of channel B of the current pixel and the minimum chrominance value of channel B in the predefined neighborhood pixel window is greater than or equal to a predetermined threshold.

The conditions at procedure 708 are similar to the conditions at procedure 608 discussed above, therefore the conditions at procedure 708 are not discussed in detail here. The predetermined thresholds may be different for three channels, that is, the luminance channel, the chrominance channel A and the chrominance channel B.

If any one of three conditions at procedure 708 is satisfied, the method 600 proceeds to procedure 710. At procedure 710, the controller assigns the value of edge pixel as 1 (i.e., determines that the current pixel is an edge pixel). In other words, if any one of the three conditions at procedure 706 and any one of the three conditions at procedure 708 are satisfied, then the controller, at procedure 710, assigns the value of edge pixel as 1 (i.e., determines that the current pixel is an edge pixel), and the method 600 ends at procedure 715.

If none of three conditions at procedure 706 is satisfied, the controller, at procedure 712, determines whether a third predetermined criteria is satisfied. If none of three conditions at procedure 708 is satisfied, the controller, at procedure 712, determines whether the third predetermined criteria is satisfied.

The third predetermined criteria includes determining combined sum of (a) an absolute difference between the maximum luminance value and the minimum luminance value; (b) an absolute difference between the maximum chrominance value of the first chrominance channel and the minimum chrominance value of the first chrominance channel; and (c) an absolute difference between the maximum chrominance value of the second chrominance channel and the minimum chrominance value of the second chrominance channel, is greater than or equal to a predetermined threshold.

In one embodiment, in order to determine whether the combined sum of (a) an absolute difference between the maximum luminance value and the minimum luminance value; (b) an absolute difference between the maximum chrominance value of the first chrominance channel and the minimum chrominance value of the first chrominance channel; and (c) an absolute difference between the maximum chrominance value of the second chrominance channel and the minimum chrominance value of the second chrominance channel, is greater than or equal to a predetermined threshold, the controller uses the following formula:

$$\{absolute(lum\_max-lum\_min)+absolute(chrom\_A\_max-chrom\_A\_min)+absolute(chrom\_B\_max-chrom\_B\_min)\}>=(SegLumClrConThr-Deltawhite) \quad (712)$$

where:
lum_max is the maximum luminance value in the predefined neighborhood pixel window;
lum_min is the minimum luminance value in the predefined neighborhood pixel window;
chrom_A_max is the maximum chrominance value of channel A in the predefined neighborhood pixel window;
chrom_A_min is the minimum chrominance value of channel A in the predefined neighborhood pixel window;
chrom_B_max is the maximum chrominance value of channel B in the predefined neighborhood pixel window;
chrom_B_min is the minimum chrominance value of channel B in the predefined neighborhood pixel window;
SegLumClrConThr is a predetermined threshold; and
DeltaWhite is a predetermined threshold.

The value of SegLumClrConThr may generally range from 0 to 120. In one embodiment, SegLumClrConThr may generally have a value of 70 or 90.

The value of DeltaWhite may range from 0 to the value of SegLumClrConThr. The value of DeltaWhite is generally less than SegLumClrConThr. In one embodiment, DeltaWhite may generally have a value of 10 or 20. In one embodiment, the value of DeltaWhite is less than the value of DeltaBlack.

If the condition (i.e., the equation 712) at procedure 712 is satisfied, the controller, at procedure 710, assigns the value of edge pixel as 1 (i.e., determines that the current pixel is an edge pixel), and the method 600 ends at procedure 715.

If the condition (i.e., the equation 712) at procedure 712 is not satisfied, the controller, at procedure 714, assigns the value of edge pixel as 0 (i.e., determines that the current pixel is not an edge pixel), and the method 600 ends at procedure 715.

Figure 9A:
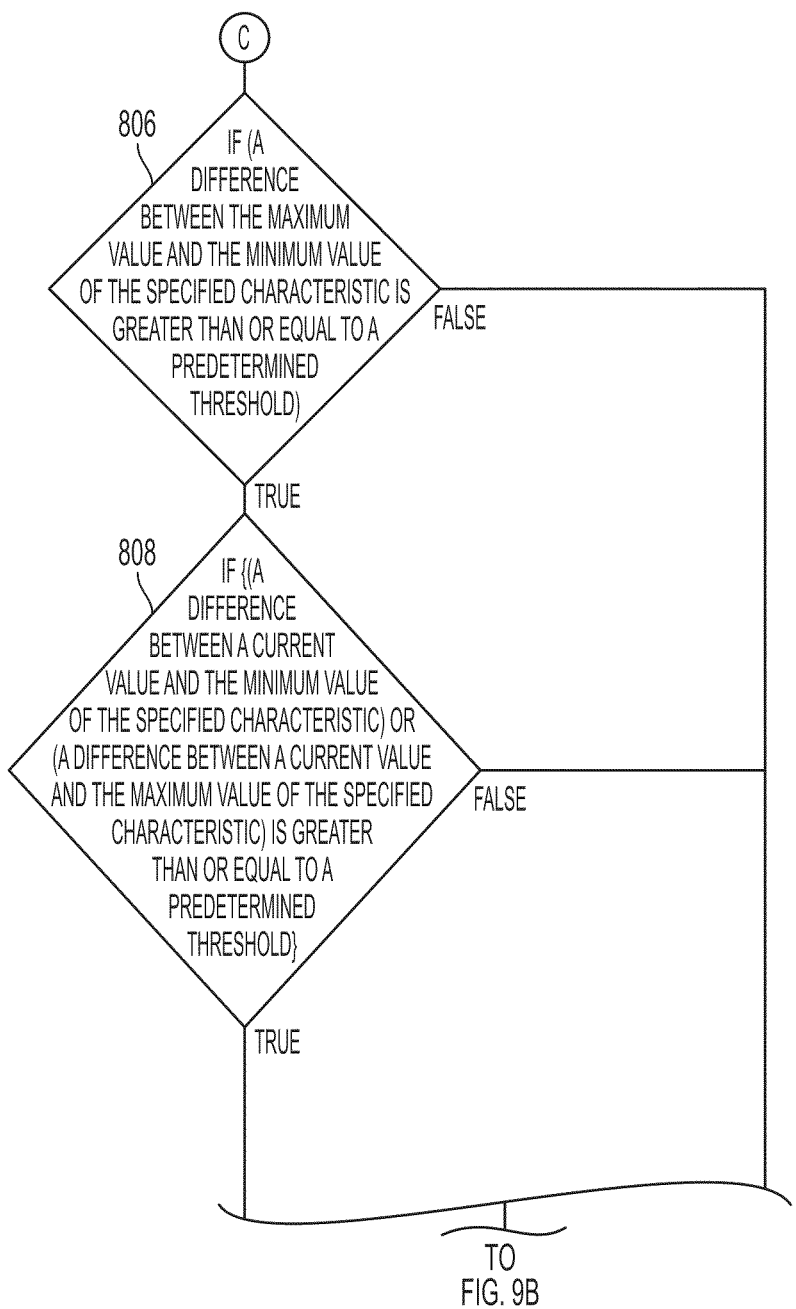
FIGS. 9A and 9B illustrate the method for detecting edge pixels in the image plane, wherein the current pixel of interest is either a colored pixel or a pixel in midtone regions of the image in accordance with an embodiment of the present disclosure.
Figure 9B:
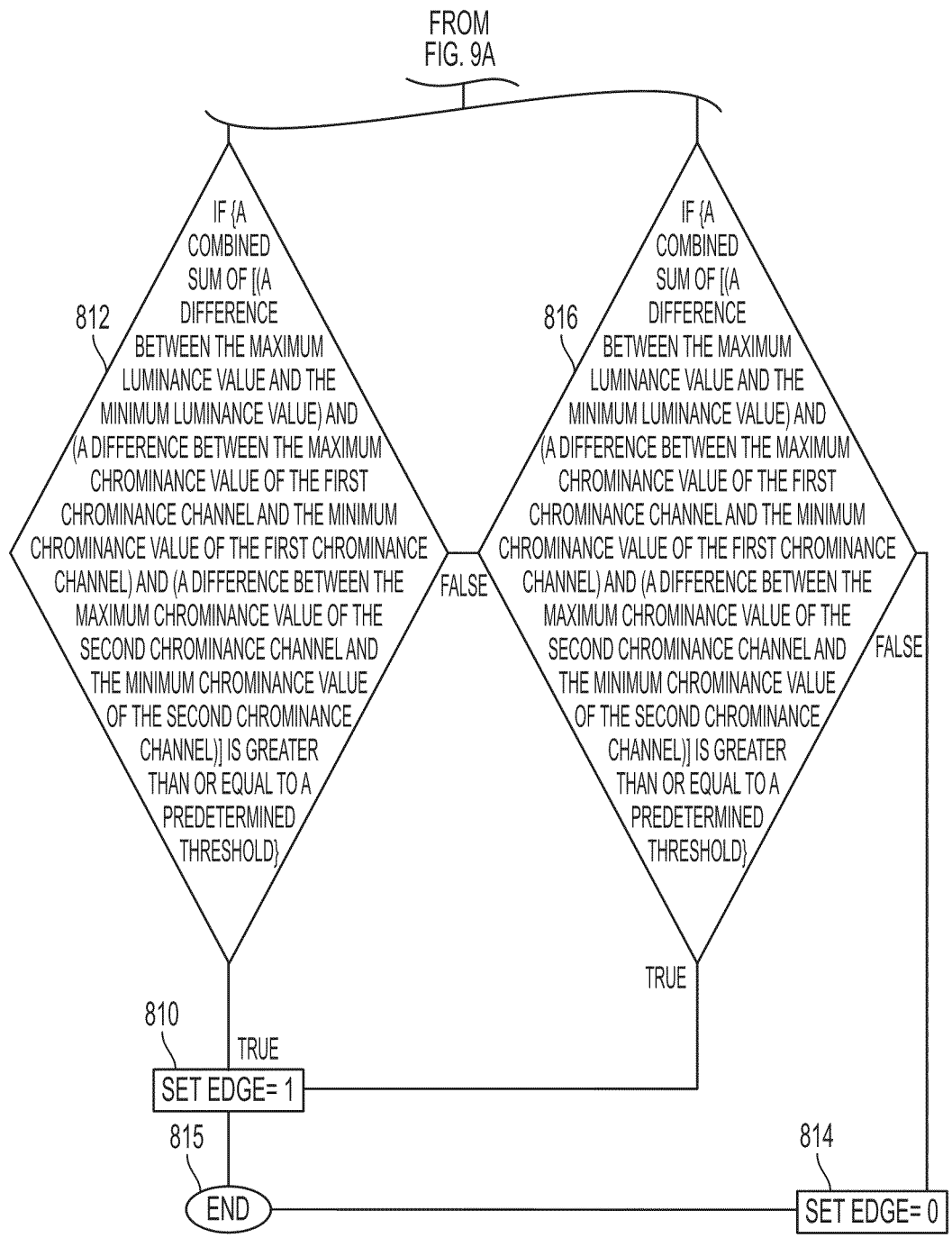

If the conditions at procedure 704 are not satisfied, then it is determined that the current pixel of interest is neither a white pixel nor a black pixel, but in one embodiment the current pixel of interest may be a non-neutral pixel in the shadow regions or the highlight regions of the image. In one embodiment, the current pixel may be non-neutral pixel in the whole dynamic range (0→255). In another embodiment, the current pixel of interest may be a pixel in the midtone regions of the image. The midtone regions of the image may include non-neutral midtone regions, and/or neutral midtone regions. FIGS. 9A and 9B illustrate the method for detecting edge pixels in the image plane, wherein the current pixel of interest is either a non-neutral pixel or a neutral pixel in midtone regions of the image, or a non-neutral in the highlight and shadow regions of the image in accordance with an embodiment of the present disclosure. At procedure 806, the controller determines whether an absolute difference between the maximum and the minimum value of the specified characteristic is greater than or equal to a predetermined threshold. In other words, the controller, at procedure 806, determines whether a) the absolute difference between the maximum luminance value in the predefined neighborhood pixel window and the minimum luminance value in the predefined neighborhood pixel window is greater than or equal to a predetermined threshold, b) the absolute difference between the maximum chrominance value of channel A in the predefined neighborhood pixel window and the minimum chrominance value of channel A in the predefined neighborhood pixel window is greater than or equal to a predetermined threshold, or c) the absolute difference between the maximum chrominance value of channel B in the predefined neighborhood pixel window and the minimum chrominance value of channel B in the predefined neighborhood pixel window is greater than or equal to a predetermined threshold.

The conditions at procedure 806 are similar to the conditions at procedure 606 discussed above, therefore the conditions at procedure 806 are not discussed in detail here.

If any one of three conditions at procedure 806 is satisfied, the method 600 proceeds to procedure 808. At procedure 808, the controller determines whether (i) an absolute difference between a current value and the minimum value of the specified characteristic, or (ii) an absolute difference between a current value and the maximum value of the specified characteristic is greater than or equal to a predetermined threshold. In other words, the controller, at procedure 808, determines whether (i) an absolute difference between the luminance value of the current pixel and the maximum luminance value in the predefined neighborhood pixel window or an absolute difference between the luminance value of the current pixel and the minimum luminance value in the predefined neighborhood pixel window is greater than or equal to a predetermined threshold, (ii) an absolute difference between the chrominance value of channel A of the current pixel and the maximum chrominance value of channel A in the predefined neighborhood pixel window or an absolute difference between the chrominance value of channel A of the current pixel and the minimum chrominance value of channel A in the predefined neighborhood pixel window is greater than or equal to a predetermined threshold, or (iii) an absolute difference between the chrominance value of channel B of the current pixel and the maximum chrominance value of channel B in the predefined neighborhood pixel window or an absolute difference between the chrominance value of channel B of the current pixel and the minimum chrominance value of channel B in the predefined neighborhood pixel window is greater than or equal to a predetermined threshold.

The conditions at procedure 808 are similar to the conditions at procedure 608 discussed above, therefore the conditions at procedure 808 are not discussed in detail here. The predetermined thresholds may be different for three channels, that is, the luminance channel, the chrominance channel A and the chrominance channel B.

If any one of three conditions at procedure 808 is satisfied, the method 600 proceeds to procedure 812. At procedure 812, the controller determines whether a fourth predetermined criteria is satisfied. The fourth predetermined criteria includes determining whether the combined sum of (a) an absolute difference between the maximum luminance value and the minimum luminance value; (b) an absolute difference between the maximum chrominance value of the first chrominance channel and the minimum chrominance value of the first chrominance channel; and (c) an absolute difference between the maximum chrominance value of the second chrominance channel and the minimum chrominance value of the second chrominance channel, is greater than or equal to a predetermined threshold.

In one embodiment, in order to determine whether the combined sum of (a) an absolute difference between the maximum luminance value and the minimum luminance value; (b) an absolute difference between the maximum chrominance value of the first chrominance channel and the minimum chrominance value of the first chrominance channel; and (c) an absolute difference between the maximum chrominance value of the second chrominance channel and the minimum chrominance value of the second chrominance channel, is greater than or equal to a predetermined threshold, the controller uses the following formula:

$$\{absolute(lum\_max - lum\_min) + absolute(chrom\_A\_max - chrom\_A\_min) + absolute(chrom\_B\_max - chrom\_B\_min)\} >= (SegLumClrConThr - DeltaColor1) \quad (812)$$

where:
lum_max is the maximum luminance value in the predefined neighborhood pixel window;
lum_min is the minimum luminance value in the predefined neighborhood pixel window;
chrom_A_max is the maximum chrominance value of channel A in the predefined neighborhood pixel window;
chrom_A_min is the minimum chrominance value of channel A in the predefined neighborhood pixel window;
chrom_B_max is the maximum chrominance value of channel B in the predefined neighborhood pixel window;

chrom_B_min is the minimum chrominance value of channel B in the predefined neighborhood pixel window;

SegLumClrConThr is a predetermined threshold; and

DeltaColor1 is a predetermined threshold.

The value of SegLumClrConThr may generally range from 0 to 120. In one embodiment, SegLumClrConThr may generally have a value of 70 or 90.

The value of DeltaColor1 may range from 0 to the value of SegLumClrConThr. The value of DeltaColor1 is generally less than SegLumClrConThr. In one embodiment, DeltaColor1 may generally range from 0 to 255. In one embodiment, the value of DeltaColor1 may be less than the value of DeltaWhite and/or DeltaBlack. In one embodiment, the DeltaColor1 may be signed value.

If the condition (i.e., the equation 812) at procedure 812 is satisfied, the controller, at procedure 810, assigns the value of edge pixel as 1 (i.e., determines that the current pixel is an edge pixel), and the method 600 ends at procedure 815.

If the condition (i.e., the equation 812) at procedure 812 is not satisfied, the controller, at procedure 816, determines whether a fifth predetermined criteria is satisfied. If none of three conditions at procedure 806 is satisfied, the controller, at procedure 816, determines whether the fifth predetermined criteria is satisfied. If none of three conditions at procedure 808 is satisfied, the controller, at procedure 816, determines whether the fifth predetermined criteria is satisfied.

The fifth predetermined criteria includes determining the combined sum of (a) an absolute difference between the maximum luminance value and the minimum luminance value; (b) an absolute difference between the maximum chrominance value of the first chrominance channel and the minimum chrominance value of the first chrominance channel; and (c) an absolute difference between the maximum chrominance value of the second chrominance channel and the minimum chrominance value of the second chrominance channel, is greater than or equal to a predetermined threshold.

In one embodiment, in order to determine whether the combined sum of (a) an absolute difference between the maximum luminance value and the minimum luminance value; (b) an absolute difference between the maximum chrominance value of the first chrominance channel and the minimum chrominance value of the first chrominance channel; and (c) an absolute difference between the maximum chrominance value of the second chrominance channel and the minimum chrominance value of the second chrominance channel, is greater than or equal to a predetermined threshold, the controller uses the following formula:

$$\{absolute(lum\_max-lum\_min)+absolute(chrom\_A\_max-chrom\_A\_min)+absolute(chrom\_B\_max-chrom\_B\_min)\} \geq (SegLumClrConThr+DeltaColor2) \quad (816)$$

where:

lum_max is the maximum luminance value in the predefined neighborhood pixel window;

lum_min is the minimum luminance value in the predefined neighborhood pixel window;

chrom_A_max is the maximum chrominance value of channel A in the predefined neighborhood pixel window;

chrom_A_min is the minimum chrominance value of channel A in the predefined neighborhood pixel window;

chrom_B_max is the maximum chrominance value of channel B in the predefined neighborhood pixel window;

chrom_B_min is the minimum chrominance value of channel B in the predefined neighborhood pixel window;

SegLumClrConThr is a predetermined threshold; and

DeltaColor2 is a predetermined threshold.

The value of SegLumClrConThr may generally range from 0 to 120. In one embodiment, SegLumClrConThr may generally have a value of 70 or 90.

The value of DeltaColor2 may range from 0 to the value of SegLumClrConThr. The value of DeltaColor2 is generally less than SegLumClrConThr. In one embodiment, DeltaColor2 may generally range from 0 to 255. In one embodiment, the value of DeltaColor2 may be less than the value of DeltaColor1. In one embodiment, the DeltaColor2 may be signed value.

In one embodiment, the DeltaColor1 and the DeltaColor2 may include signed (i.e., positive or negative values) values. Therefore, in one embodiment, the value of the threshold in equations 812 and 816 may be increased.

If the condition (i.e., the equation 816) at procedure 816 is satisfied, the controller, at procedure 814, assigns the value of edge pixel as 1 (i.e., determines that the current pixel is an edge pixel), and the method 600 ends at procedure 815.

If the condition (i.e., the equation 816) at procedure 816 is not satisfied, the controller, at procedure 814, assigns the value of edge pixel as 0 (i.e., determines that the current pixel is not an edge pixel), and the method 600 ends at procedure 815.

Thus, the controller of the method 600, as described above, is configured to determined whether the current pixel is (i) a black pixel or a neutral pixel in the shadow region of the image; (ii) a white pixel, or a neutral pixel that is in the highlight region of the image; or (iii) a neutral pixel or a non-neutral pixel in the midtone regions of the image.

However, it is contemplated that the controller of the method 600 may further be configured to use different thresholds for different regions of the luminance dynamic range. The method for detecting the edge pixels in accordance with an embodiment of the present disclosure, may be applied to the pixels in different regions of the image (i.e., other than the neutral shadow regions, the neutral or non-neutral midtone regions, and the neutral highlight and white regions that are previously described). In one embodiment, the image may be further sub-divided into different areas or regions, and the method may be applied to detect edge pixels in such areas or regions of the image.

For example, in addition to procedures 604 and 704 discussed above, the method 600 may also include additional procedures to determine whether the current pixel is a pixel in the neutral gray region of the image. In such an embodiment, if the luminance value of the luminance channel for the current pixel is within a predetermined threshold (i.e., falling with a range of 50-160), then based on the neutrality of the chrominance value of the first chrominance channel and the chrominance value of the second chrominance channel, the pixel may be identified as a pixel either in the non-neutral, lower midtone or lower, neutral gray region; and if the luminance value of the luminance channel for the current pixel is within a predetermined threshold (i.e., falling with a range of 200-220), then based on the neutrality of the chrominance value of the first chrominance channel and the chrominance value of the second chrominance channel, the pixel may be identified as a pixel either in the color, gray or midtone region.

It is contemplated that the parameters used by the controller of the present disclosure (e.g., LumTHR0, Neutral_THR, DIFF_THR, MIN_MAX_THR, LumTHR1WHITE, SegLumClrConThr, DeltaBlack, DeltaWhite, DeltaColor1, and DeltaColor2) may remain constant for a particular image or a particular simulation. These parameters will not be changed dynamically for a particular image or a particular simulation.

These parameters, however, may be changed from image to image, customer to customer, or product to product based on their usage, image characteristics such as the image background and image offset and/or customer preference. In one embodiment, it is contemplated that more parameters may be added to the method of the present disclosure based on the division of luminance dynamic range into different regions, and also based on the neutrality or non-neutrality of the chrominance channels.

Figures 10, 11:
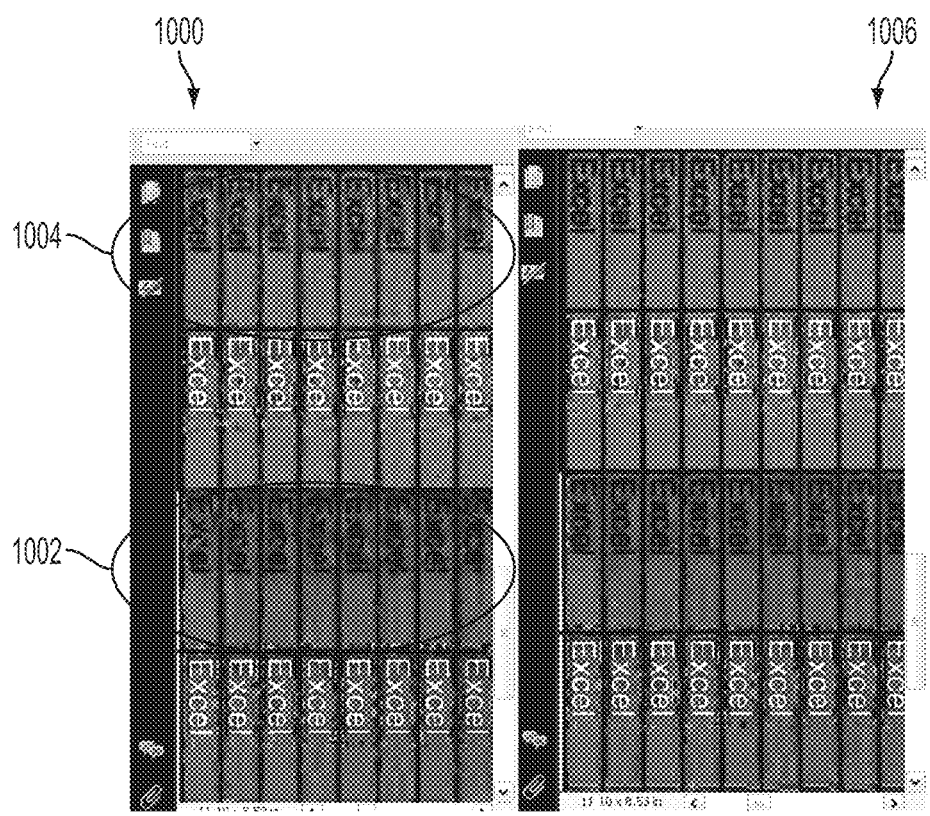
FIGS. 10 and 11 illustrate digital images output by a prior art three layer segmentor used for MRC representation and by the method in accordance with an embodiment of the present disclosure, respectively.
Figures 12, 13:
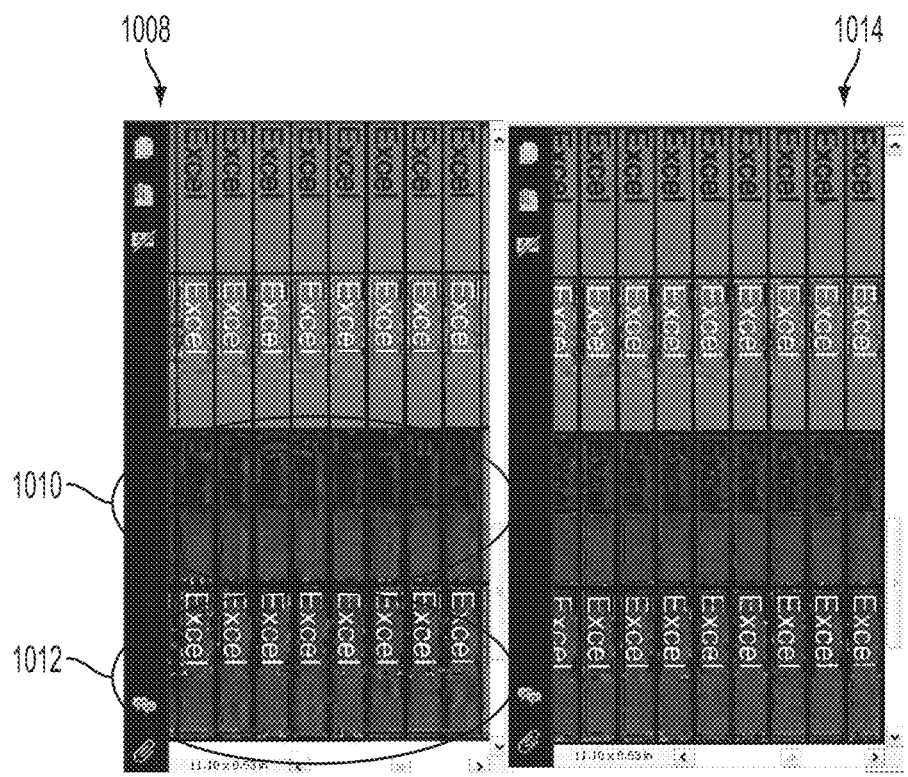
FIGS. 12 and 13 illustrate digital images output by a prior art three layer segmentor used for MRC representation and by the method in accordance with an embodiment of the present disclosure, respectively.

FIGS. 10 and 12 illustrate digital images (e.g., for an Excel image) output by a prior art three layer segmentor used for MRC representation, and FIGS. 11 and 13 illustrate the digital images (e.g., for the Excel image) output in accordance with an embodiment of the present disclosure. The digital images shown in FIGS. 10-13 show many text on tint areas. Specifically, FIG. 10 illustrates an example of an image 1000 that is output from an "Excel" input image using a prior art method. As shown by sections 1002 and 1004 in FIG. 10, the prior art method may have a lower quality due to degraded pixels (e.g., ringing artifacts, low text quality) that are present after processing the original input image data. FIG. 11 illustrates an example, of an image 1006 that is output from the same "Excel" input image, once processed using the method in accordance with an embodiment of the present disclosure. As shown, such pixels are eliminated and image quality is improved. FIG. 12 illustrates an example of a second image 1008 that is output from an "Excel" input image using a prior art method. As shown by sections 1010 and 1012 in FIG. 12, the prior art method may have a lower quality due to degraded pixels that represent after processing the original input image data. FIG. 13 illustrates an example, of an image 1014 that is output from the same "Excel" input image, once processed using the method in accordance with an embodiment of the present disclosure. As shown, such pixels are eliminated and image quality is improved. It can be clearly seen from FIGS. 11 and 13 that the method in accordance with an embodiment of the present disclosure improves the image quality of the Excel image. As shown in Table 1 below, the file size of the Excel image output in accordance with an embodiment of the present disclosure is 144 KB and the file size of the Excel image output by a prior art three layer segmentor is 151 KB. Thus, the method in accordance with an embodiment of the present disclosure improves the image quality of the Excel image without impacting the file size of this image.

Figures 14, 15:
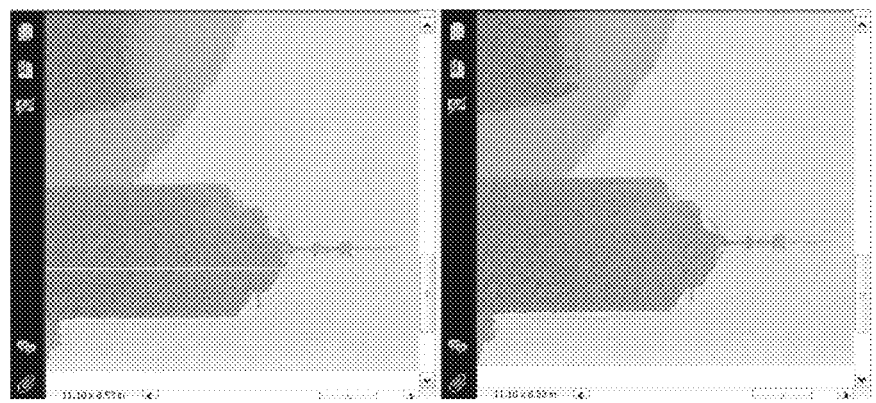
FIGS. 14 and 15 illustrate digital images output by a prior art three layer segmentor used for MRC representation and by the method in accordance with an embodiment of the present disclosure, respectively.
Figure 16:
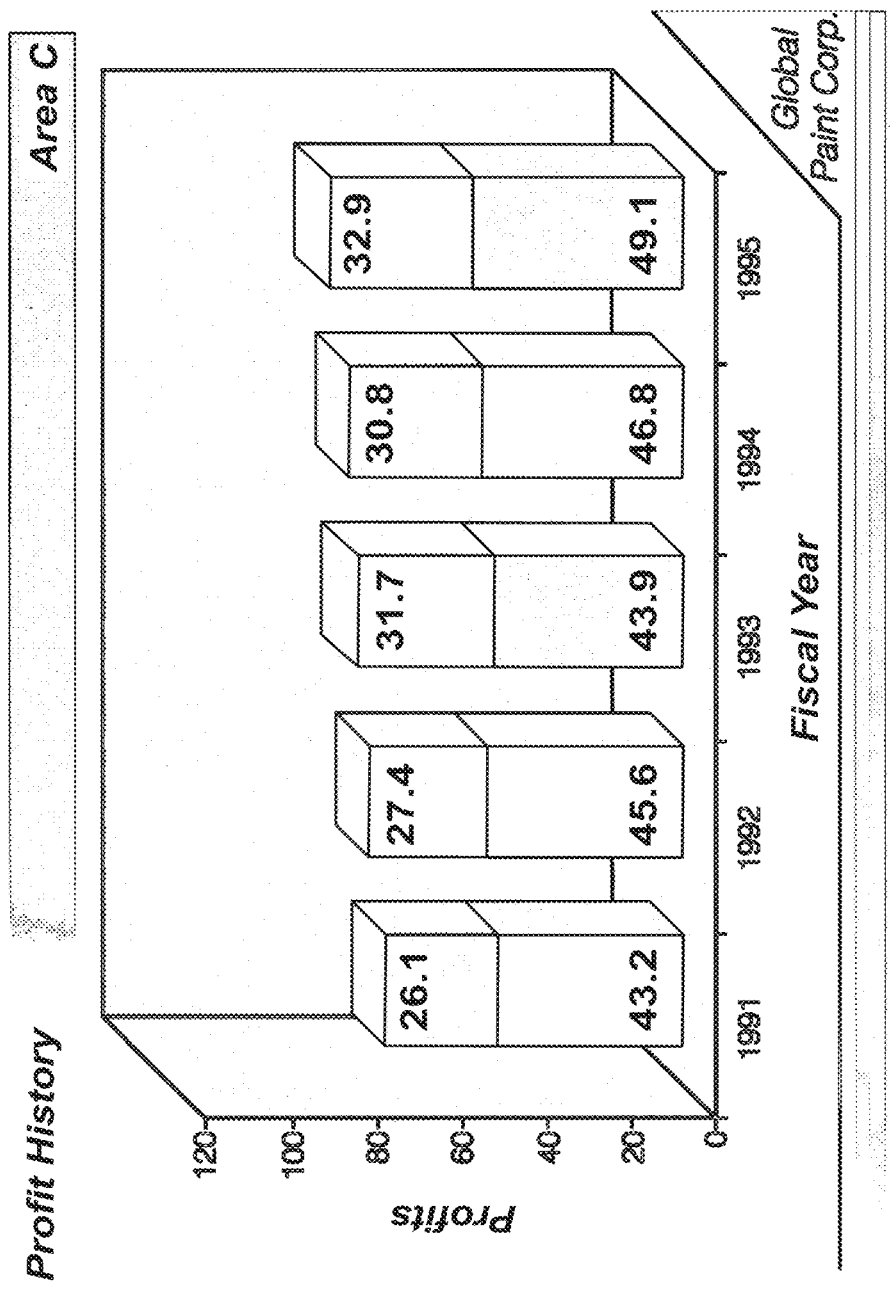
FIGS. 16 and 17 illustrate a digital image and an edge profile that is created from the digital image, respectively (i.e., using prior art segmentors and edge detectors).
Figure 17:
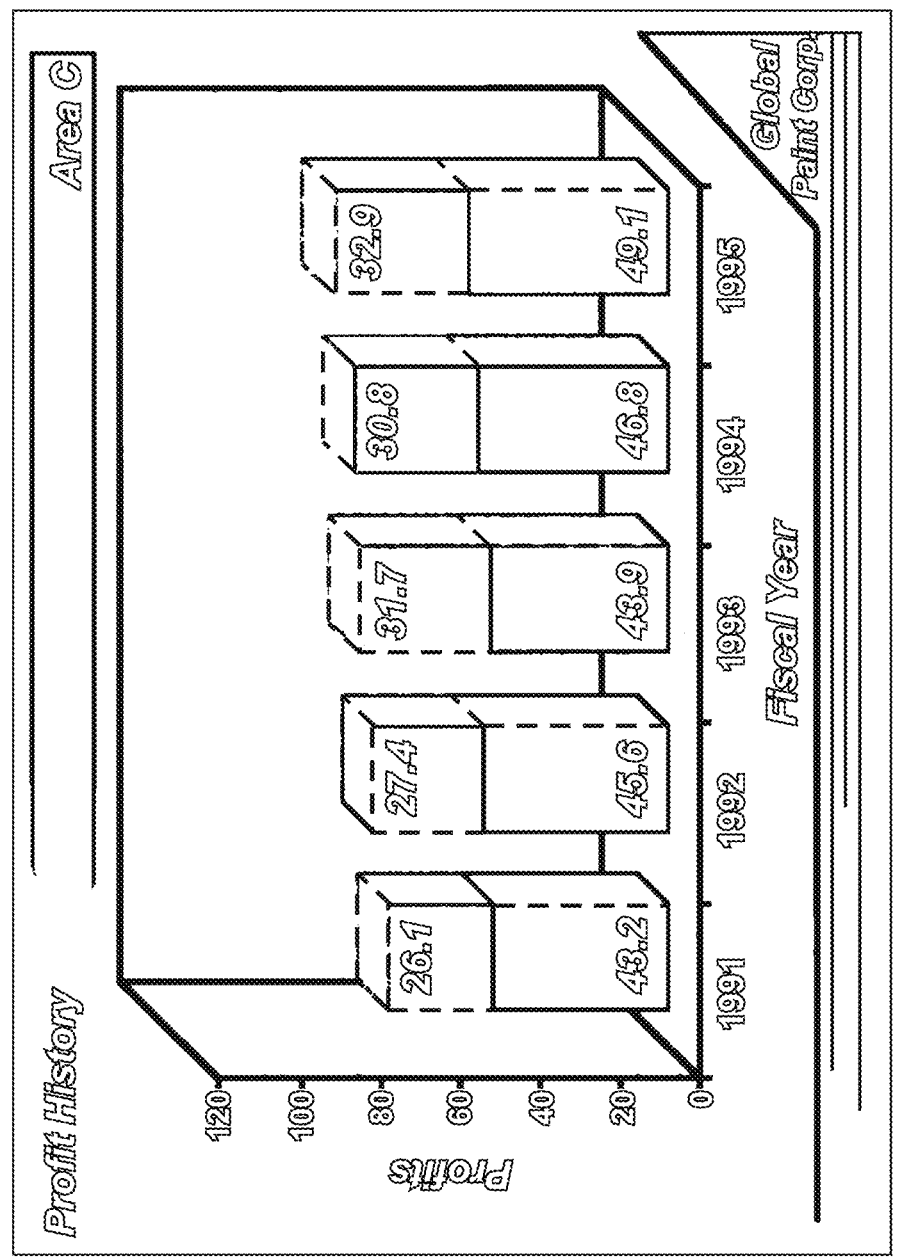

FIG. 14 illustrates a digital image (e.g., for a Seattle image) output by a prior art three layer segmentor used for MRC representation, and FIG. 15 illustrates the digital image (e.g., for the Seattle image) output in accordance with an embodiment of the present disclosure. The digital image shown in FIGS. 14-15 is a pictorial image. It can be clearly seen from FIG. 15 that the method in accordance with an embodiment of the present disclosure improves compression ratio without impacting the the image quality of the Seattle image. As shown in Table 1 below, the file size of the Seattle image output in accordance with an embodiment of the present disclosure is 243 KB and the file size of the Seattle image output by a prior art three layer segmentor is 330 KB. Therefore, the file size of the Seattle image output in accordance with an embodiment of the present disclosure is reduced by 25% in comparison with the file size of the Seattle image output by a prior art three layer segmentor.

In one embodiment, the file size of the digital image may further be reduced using the count of the non-background pixels in the background plane. First, the count of non-background pixels in the background plane is determined. If the count of non-background pixels in the background plane is determined to be less than 10% of the original image size, then the background plane may be sub sampled to a bigger value. For example, instead of using a 2×2 or a 4×4 sub sampling size, a 128×128 or greater sub sampling size may be used for the background plane.

Table 1 shows a comparison between the file sizes of digital images output by a prior art three layer segmentor used for MRC representation and the file sizes of digital images output in accordance with an embodiment of the present disclosure.

TABLE 1

| Image | File size of the digital images output by a prior art three layer segmentor (Kilobytes) | File size of the digital images output in accordance with an embodiment of the present disclosure (Kilobytes) |
| --- | --- | --- |
| Image 1 (e.g., Seattle as shown in FIGS. 14-15) | 330 | 243 |
| Image 2 (e.g., Excel as shown in FIGS. 10-13) | 151 | 144 |
| Image 3 | 118 | 114 |
| Image 4 | 207 | 167 |
| Image 5 | 141 | 123 |
| Image 6 | 73 | 66 |
| Image 7 | 145 | 146 |

As shown in Table 1, the file size of the digital images output in accordance with an embodiment of the present disclosure is less than the file size of the digital images output by a prior art three layer segmentor. Therefore, the method in accordance with an embodiment of the present disclosure not only improves the image quality of the digital images (as shown in FIGS. 10-13) but also reduces the file size of the digital images (FIGS. 14-15).

The controller disclosed herein may be dedicated hardware like ASICs or FPGAs, software, or a combination of dedicated hardware and software. For the different applications of the embodiments disclosed herein, the programming and/or configuration may vary. The controller may be incorporated, for example, into a dynamic threshold module of a scan segmentation module.

The method and the system for detecting edge pixels in an image plane is described in the present disclosure using a three layer MRC model. It should be appreciated, however, that the method and the system for detecting edge pixels in an image plane can be extended to any MRC model, including, but not limited to a N layer MRC model, a 3+1 layer MRC model, a 3+N layer MRC model, or any other MRC models. In one embodiment, the method and the system for detecting edge pixels described in the present disclosure may be applied to non-MRC models.

Embodiments can be implemented in the context of modules. In the computer programming arts, a module can be typically implemented as a collection of routines and data structures that performs particular tasks or implements a particular abstract data type. Modules generally can be composed of two parts. First, a software module may list the constants, data types, variable, routines and the like that can be accessed by other modules or routines. Second, a software module can be configured as an implementation, which can be private (i.e., accessible perhaps only to the module), and that contains the source code that actually implements the routines or subroutines upon which the module is based. Thus, for example, the term module, as utilized herein generally refers to software modules, hardware modules, or implementations thereof. Such modules can be utilized separately or together to form a program product that can be implemented. The concept of "modules" as used herein is notional, and is used only for purposes of clear explanation of the described method.

While the present disclosure has been described in connection with what is presently considered to be the most practical and preferred embodiment, it is to be understood that it is capable of further modifications and is not to be limited to the disclosed embodiment, and this application is intended to cover any variations, uses, equivalent arrangements or adaptations of the present disclosure following, in general, the principles of the present disclosure and including such departures from the present disclosure as come within known or customary practice in the art to which the present disclosure pertains, and as may be applied to the essential features hereinbefore set forth and followed in the spirit and scope of the appended claims.

What is claimed is:

1. A method for detecting edge pixels in an image plane based on intensity and neutrality of a current pixel, when separating an image signal into a set of image planes, the method comprising:
   searching, via a min-max module, for a minimum value and a maximum value of a specified characteristic within at least one predefined neighborhood pixel window centered on the current pixel in the image signal, wherein the predefined neighborhood pixel window comprises the edge pixels; and
   detecting, via a dynamic threshold module, the edge pixels in the image plane based on predetermined criteria, wherein the predetermined criteria for detecting the edge pixels comprises determining whether:
      (a) a difference between the maximum value and the minimum value of the specified characteristic is greater than or equal to a first predetermined threshold, wherein the first predetermined threshold is based on the intensity and the neutrality of the current pixel in the image signal; and
      (b) (i) a difference between a current pixel value and the minimum value of the specified characteristic, or (ii) a difference between the current pixel value and the maximum value of the specified characteristic is greater than or equal to a second predetermined threshold, wherein the second predetermined threshold is based on the intensity and the neutrality of the current pixel in the image signal,
   wherein the specified characteristic within at least one predefined neighborhood pixel window centered on the current pixel is at least one selected from a luminance value of a luminance channel, a chrominance value of a first chrominance channel, and a chrominance value of a second chrominance channel, and
   wherein the neutrality of the current pixel is dependent on the chrominance value of the first chrominance channel, and the chrominance value of the second chrominance channel.

2. A method according to claim 1, wherein detecting the edge pixels further comprising a black color pixel or shadow region pixel identification criteria, the black color pixel or shadow region pixel identification criteria comprises determining whether
   (a) a luminance value of the current pixel is less than a predetermined threshold; and
   (b) chrominance values of the current pixel are within a predetermined range including a neutral value, where the neutral value is a midpoint of a range of color intensity values.

3. A method according to claim 2, wherein the predetermined criteria is checked, when the black color pixel or neutral shadow region pixel identification criteria is satisfied.

4. A method according to claim 3, wherein a white color pixel or neutral highlight region pixel identification criteria is checked, when the black color pixel or neutral shadow region pixel identification criteria is not satisfied.

5. A method according to claim 4, wherein the white color pixel or neutral highlight region pixel identification criteria comprises determining whether
   (a) a luminance value of the current pixel is greater than or equal to a predetermined threshold; and
   (b) chrominance values of the current pixel are within a predetermined range including the neutral value, where the neutral value is a midpoint of a range of color intensity values.

6. A method according to claim 5, wherein the predetermined criteria is checked, when the white color pixel or neutral highlight region pixel identification criteria is satisfied.

7. A method according to claim 6, wherein detecting the edge pixels further comprising a third predetermined criteria, when the predetermined criteria is not satisfied.

8. A method according to claim 7, wherein the third predetermined criteria comprises determining whether a combined sum of
   (a) a difference between a maximum luminance value and a minimum luminance value;
   (b) a difference between a maximum chrominance value of the first chrominance channel and a minimum chrominance value of the first chrominance channel; and
   (c) a difference between a maximum chrominance value of the second chrominance channel and a minimum chrominance value of the second chrominance channel, is greater than or equal to a predetermined threshold.

9. A method according to claim 5, wherein the predetermined criteria and a neutral or non-neutral midtone region pixel identification criteria is checked, when the white color pixel or neutral highlight region pixel identification criteria is not satisfied.

10. A method according to claim 9, wherein detecting the edge pixels further comprising a fourth predetermined criteria, when the predetermined criteria and the neutral or non-neutral midtone region pixel identification criteria are not satisfied.

11. A method according to claim 10, wherein the fourth predetermined criteria comprises determining whether a combined sum of
   (a) a difference between a maximum luminance value and a minimum luminance value;
   (b) a difference between a maximum chrominance value of the first chrominance channel and a minimum chrominance value of the first chrominance channel; and
   (c) a difference between a maximum chrominance value of the second chrominance channel and a minimum chrominance value of the second chrominance channel, is greater than or equal to a predetermined threshold.

12. A method according to claim 3, wherein detecting the edge pixels further comprising a second predetermined criteria, when the predetermined criteria is not satisfied.

13. A method according to claim 12, wherein the second predetermined criteria comprises determining whether a combined sum of
   (a) a difference between a maximum luminance value and a minimum luminance value;

(b) a difference between a maximum chrominance value of the first chrominance channel and a minimum chrominance value of the first chrominance channel; and (c) a difference between a maximum chrominance value of the second chrominance channel and a minimum chrominance value of the second chrominance channel, is greater than or equal to a predetermined threshold.

14. A system for detecting edge pixels in an image plane based on intensity and neutrality of a current pixel, when separating an image signal into a set of image planes, the system comprising:

at least one processor comprising a min-max module and a dynamic threshold module; and a non-transitory computer-readable storage medium in communication with the at least one processor, the min-max module configured to search for a minimum value and a maximum value of a specified characteristic within at least one predefined neighborhood pixel window centered on a current pixel in the image signal, wherein the predefined neighborhood pixel window comprises the edge pixels; and the dynamic threshold module configured to detect the edge pixels in the image plane based on predetermined criteria, wherein the predetermined criteria for detecting the edge pixels comprises determining whether:

(a) a difference between the maximum value and the minimum value of the specified characteristic is greater than or equal to a first predetermined threshold, wherein the first predetermined threshold is based on intensity and neutrality of the current pixel in the image signal; and (b) (i) a difference between a current pixel value and the minimum value of the specified characteristic, or (ii) a difference between the current pixel value and the maximum value of the specified characteristic is greater than or equal to a second predetermined threshold, wherein the second predetermined threshold is based on the intensity and the neutrality of the current pixel in the image signal, wherein the specified characteristic within at least one predefined neighborhood pixel window centered on the current pixel is at least one selected from a luminance value of a luminance channel, a chrominance value of a first chrominance channel, and a chrominance value of a second chrominance channel, and wherein the neutrality of the current pixel is dependent on the chrominance value of the first chrominance channel, and the chrominance value of the second chrominance channel.

15. A system according to claim 14, wherein the dynamic threshold module comprises a black color pixel or neutral shadow region pixel identification criteria, the black color pixel or neutral shadow region pixel identification criteria comprises determining whether (a) a luminance value of the current pixel is less than a predetermined threshold; and (b) chrominance values of the current pixel are within a predetermined range including a neutral value, where the neutral value is a midpoint of a range of color intensity values.

16. A system according to claim 15, wherein the predetermined criteria is checked, when the black color pixel or neutral shadow region pixel identification criteria is satisfied.

17. A system according to claim 16, wherein a white color pixel or neutral highlight region pixel identification criteria is checked, when the black color pixel or neutral shadow region pixel identification criteria is not satisfied.

18. A system according to claim 17, wherein the white color pixel or neutral highlight region pixel identification criteria comprises determining whether (a) a luminance value of the current pixel is greater than or equal to a predetermined threshold; and (b) chrominance values of the current pixel are within a predetermined range including the neutral value, where the neutral value is a midpoint of a range of color intensity values.

19. A system according to claim 18, wherein the predetermined criteria is checked, when the white color pixel or neutral highlight region pixel identification criteria is satisfied.

20. A system according to claim 19, wherein the dynamic threshold module comprises a third predetermined criteria, when the predetermined criteria is not satisfied.

21. A system according to claim 20, wherein the third predetermined criteria comprises determining whether a combined sum of (a) a difference between a maximum luminance value and a minimum luminance value;

(b) a difference between a maximum chrominance value of the first chrominance channel and a minimum chrominance value of the first chrominance channel; and (c) a difference between a maximum chrominance value of the second chrominance channel and a minimum chrominance value of the second chrominance channel, is greater than or equal to a predetermined threshold.

22. A system according to claim 18, wherein the predetermined criteria and a neutral or non-neutral midtone region pixel identification criteria is checked, when the white color pixel or neutral highlight region pixel identification criteria is not satisfied.

23. A system according to claim 22, wherein the dynamic threshold module comprises a fourth predetermined criteria, when the predetermined criteria and the neutral or non-neutral midtone region pixel identification criteria are not satisfied.

24. A system according to claim 23, wherein the fourth predetermined criteria comprises determining whether a combined sum of (a) a difference between a maximum luminance value and a minimum luminance value;

(b) a difference between a maximum chrominance value of the first chrominance channel and a minimum chrominance value of the first chrominance channel; and (c) a difference between a maximum chrominance value of the second chrominance channel and a minimum chrominance value of the second chrominance channel, is greater than or equal to a predetermined threshold.

25. A system according to claim 16, wherein the dynamic threshold module comprises a second predetermined criteria, when the predetermined criteria are not satisfied.

26. A system according to claim 25, wherein the second predetermined criteria comprises determining whether a combined sum of (a) a difference between a maximum luminance value and a minimum luminance value;

(b) a difference between a maximum chrominance value of the first chrominance channel and a minimum chrominance value of the first chrominance channel; and (c) a difference between a maximum chrominance value of the second chrominance channel and a minimum chrominance value of the second chrominance channel, is greater than or equal to a predetermined threshold.

27. A method for detecting edge pixels in an image plane based on intensity and neutrality of a current pixel, when separating an image signal into a set of image planes, the method comprising:

dividing the image plane into one or more regions based on the intensity and the neutrality of the current pixel, wherein the intensity of the current pixel is dependent on a luminance value of a luminance channel of the current pixel, and the neutrality of the current pixel is dependent on a chrominance value of a first chrominance channel of the current pixel, and a chrominance value of a second chrominance channel of the current pixel;

searching for a minimum value and a maximum value of a specified characteristic within at least one predefined neighborhood pixel window centered on the current pixel in the one or more regions of the image plane, wherein the predefined neighborhood pixel window comprises the edge pixels; and detecting, via a dynamic threshold module, the edge pixels in the one or more regions in the image plane based on predetermined criteria, wherein the predetermined criteria for detecting the edge pixels in the one or more regions in the image plane comprises determining whether:

(a) a difference between the maximum value and the minimum value of the specified characteristic is greater than or equal to a first predetermined threshold, wherein the first predetermined threshold is based on the intensity and the neutrality of the current pixel in the image signal; and (b) (i) a difference between a current pixel value and the minimum value of the specified characteristic, or (ii) a difference between the current pixel value and the maximum value of the specified characteristic is greater than or equal to a second predetermined threshold, wherein the second predetermined threshold is based on the intensity and the neutrality of the current pixel in the image signal.

* * * * *